(12) United States Patent
Onishi et al.

(10) Patent No.: US 11,200,761 B2
(45) Date of Patent: Dec. 14, 2021

(54) PARAMETER IDENTIFYING DEVICE, SIMULATION DEVICE, AND PARAMETER IDENTIFYING METHOD

(71) Applicant: Komatsu Ltd., Tokyo (JP)

(72) Inventors: Yoshiyuki Onishi, Tokyo (JP); Shinya Kanou, Tokyo (JP); Kyohei Kuroda, Tokyo (JP); Shota Furukawa, Tokyo (JP); Naoyuki Omuro, Tokyo (JP)

(73) Assignee: KOMATSU LTD., Tokyo (JP)

( * ) Notice: Subject to any disclaimer, the term of this patent is extended or adjusted under 35 U.S.C. 154(b) by 133 days.

(21) Appl. No.: 16/605,314

(22) PCT Filed: Jun. 26, 2018

(86) PCT No.: PCT/JP2018/024133
§ 371 (c)(1),
(2) Date: Oct. 15, 2019

(87) PCT Pub. No.: WO2019/017159
PCT Pub. Date: Jan. 24, 2019

(65) Prior Publication Data
US 2020/0074766 A1  Mar. 5, 2020

(30) Foreign Application Priority Data

Jul. 18, 2017 (JP) .............................. JP2017-139406
Jul. 18, 2017 (JP) .............................. JP2017-139407

(51) Int. Cl.
*G07C 5/02* (2006.01)
*E02F 9/26* (2006.01)
(Continued)

(52) U.S. Cl.
CPC .................. *G07C 5/02* (2013.01); *E02F 9/26* (2013.01); *G06Q 50/08* (2013.01); *G07C 5/08* (2013.01);
(Continued)

(58) Field of Classification Search
CPC ... B60P 1/04; E02F 3/32; E02F 3/7609; E02F 9/2054; E02F 9/26; E02F 9/261;
(Continued)

(56) References Cited

U.S. PATENT DOCUMENTS 7,894,961 B2 * 2/2011 Blackburn ............. G07C 5/085
701/50
10,037,634 B2 * 7/2018 Christofferson ..... G07C 5/0825
(Continued)

FOREIGN PATENT DOCUMENTS

JP    H09-177321 A     7/1997
JP    2001-311175 A   11/2001
(Continued)

*Primary Examiner* — Tyler J Lee
(74) *Attorney, Agent, or Firm* — Locke Lord LLP

(57) ABSTRACT

A work state identifying unit identifies work states of a work machine. A parameter identifying unit identifies a parameter related to a work amount per unit time of the work machine or a parameter related to a speed of the work machine for each of the identified work states on the basis of a time series of position data, azimuth data, or speed data of the work machine.

12 Claims, 19 Drawing Sheets

(51) Int. Cl.
  *G06Q 50/08* (2012.01)
  *G07C 5/08* (2006.01)
  *B60P 1/04* (2006.01)
  *E02F 3/32* (2006.01)
  *E02F 3/76* (2006.01)

(52) U.S. Cl.
  CPC . *B60P 1/04* (2013.01); *E02F 3/32* (2013.01); *E02F 3/7609* (2013.01); *E02F 9/261* (2013.01)

(58) Field of Classification Search
  CPC ........... E02F 9/264; G06Q 50/08; G07C 3/08; G07C 5/02; G07C 5/08
  See application file for complete search history.

(56) References Cited

U.S. PATENT DOCUMENTS

| | | | |
|---|---|---|---|
| 2004/0210371 A1* | 10/2004 | Adachi | E02F 9/205 701/50 |
| 2012/0083968 A1 | 4/2012 | Greiner et al. | |
| 2014/0257645 A1* | 9/2014 | Date | B60K 37/06 701/50 |
| 2015/0039187 A1* | 2/2015 | Friebel | E02F 9/2246 701/50 |
| 2016/0010988 A1* | 1/2016 | Bando | G01C 5/00 701/32.3 |
| 2017/0278315 A1* | 9/2017 | Christofferson | G07C 5/0825 |
| 2018/0106018 A1* | 4/2018 | Hoshino | E02F 9/2225 |
| 2018/0218304 A1 | 8/2018 | Shike | |
| 2018/0223502 A1* | 8/2018 | Kenkel | E02F 9/26 |
| 2019/0146513 A1* | 5/2019 | Tomita | G05D 1/0278 701/50 |
| 2020/0032489 A1* | 1/2020 | Yamazaki | E02F 9/20 |

FOREIGN PATENT DOCUMENTS

| | | |
|---|---|---|
| JP | 2009-235819 A | 10/2009 |
| JP | 2010-044543 A | 2/2010 |
| JP | 2013-156835 A | 8/2013 |
| JP | 2017-071916 A | 4/2017 |
| JP | 2017-095061 A | 6/2017 |

* cited by examiner

FIG. 5

| WORK MACHINE ID | RECEPTION TIME | POSITION DATA | AZIMUTH DATA |
|---|---|---|---|
|  |  |  |  |
|  |  |  |  |

PARAMETER IDENTIFYING DEVICE, SIMULATION DEVICE, AND PARAMETER IDENTIFYING METHOD

TECHNICAL FIELD

The present invention relates to a parameter identifying device, simulation device, and parameter identifying method.

Priority is claimed on Japanese Patent Application Nos. 2017-139406 and 2017-139407 filed on Jul. 18, 2017, the contents of which are incorporated herein by reference.

BACKGROUND ART

As disclosed in PTL 1, there is a technique in which construction in a construction site is simulated by using a computer.

CITATION LIST

Patent Literature

[PTL 1] Japanese Unexamined Patent Application, First Publication No. H09-177321

SUMMARY OF INVENTION

Technical Problem

A parameter (basic unit data) representing the construction performance of a work machine in simulation is usually set on the basis of design values of the work machine or experience. On the other hand, the construction performance of an actual work machine is not necessarily the same as design values and changes depending on conditions at a site such as soil at the construction site or easiness of work, or the skill of an operator. Thus, in a case where simulation is performed with the construction performance of a work machine as design values, there is a possibility that the simulation result may be estranged from a construction progress status. Particularly, parameters (a traveling speed, a traveling time, and the like) related to the travel of a work machine differ depending on the state of the work machine or a situation of a traveling path.

Aspects of the present invention are directed to providing a parameter identifying device, a simulation device, and a parameter identifying method capable of obtaining a parameter close to the construction performance of an actual work machine.

Solution to Problem

A first aspect of the present invention provides a parameter identifying device including: a work state identifying unit that identifies work states of a work machine; and a parameter identifying unit that identifies a parameter related to a work amount per unit time of the work machine or a parameter related to a speed of the work machine for each of the work states on the basis of a time series of position data, azimuth data, or speed data of the work machine.

Advantageous Effects of Invention

According to the aspect, the parameter identifying device can obtain a parameter close to the construction performance of an actual work machine.

BRIEF DESCRIPTION OF DRAWINGS

FIG. 5 is a diagram showing data stored in a time-series storage unit.

DESCRIPTION OF EMBODIMENTS

First Embodiment

<<Construction Site>>

Figure 1:
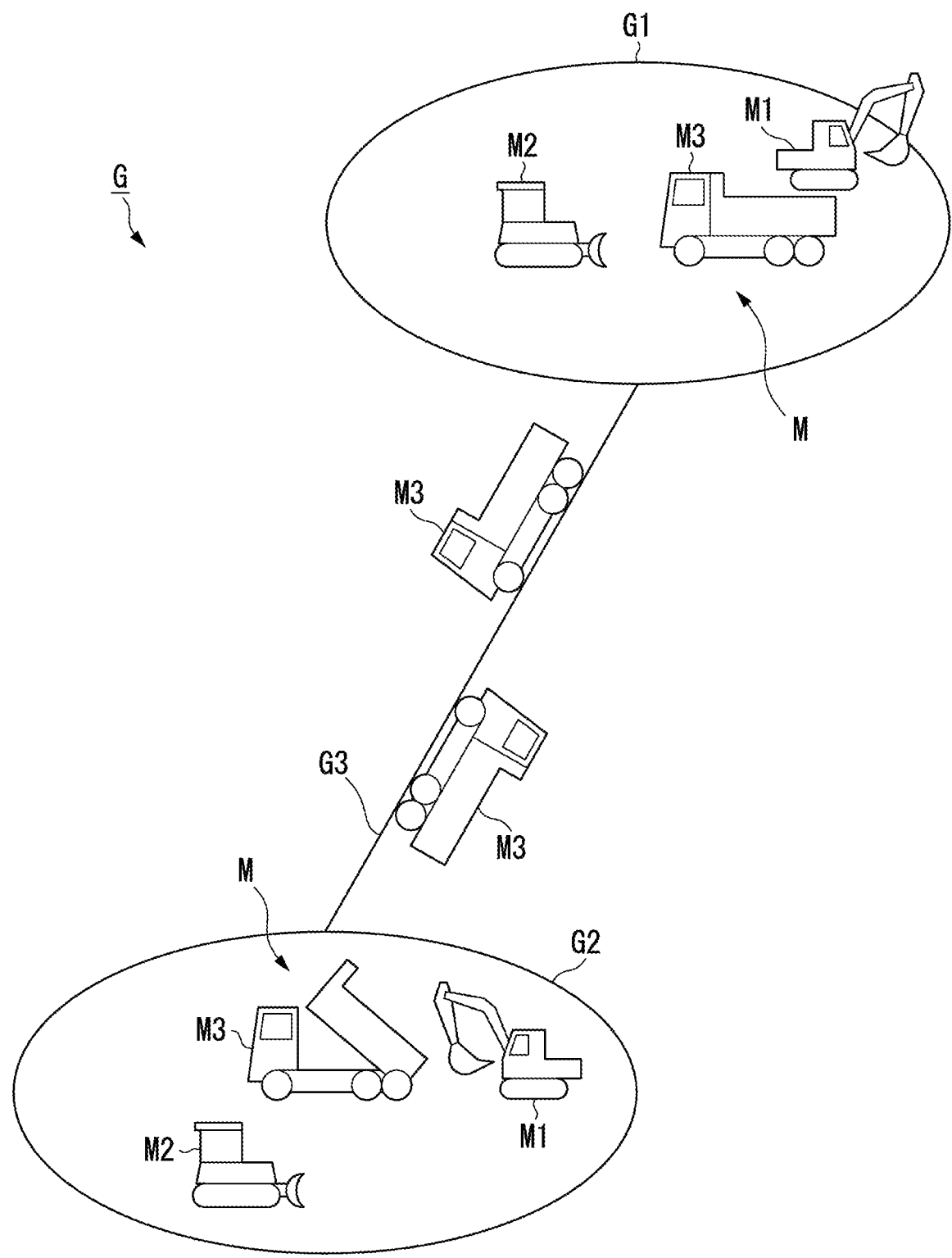
FIG. 1 is a diagram showing an example of a construction site which is a simulation target of a simulation system according to a first embodiment.

FIG. 1 is a diagram showing an example of a construction site which is a simulation target of a simulation system according to a first embodiment.

A construction site G according to the first embodiment has an earth cut location G1 and a banking location G2. The earth cut location G1 and the banking location G2 are connected to each other via a traveling path G3. The traveling path G3 includes a general road connecting the earth cut location G1 to the banking location G2, and a transport path for transport of earth and sand prepared at the construction site G. A hydraulic excavator M1 and a bulldozer M2 are disposed in each of the earth cut location G1 and the banking location G2. A plurality of dump trucks M3 travel between the earth cut location G1 and the banking location G2. The hydraulic excavator M1, the bulldozer M2, and the dump truck M3 are examples of a work machine M.

In other embodiments, in the earth cut location G1 and the banking location G2, a plurality of hydraulic excavators M1 may be disposed, a plurality of bulldozers M2 may be disposed, one of the hydraulic excavator M1 or the bulldozer M2 may not be disposed, and other work machines M may be disposed.

<<Work Machine>>

The hydraulic excavator M1 disposed in the earth cut location G1 excavates earth and sand in the earth cut location G1 and loads the earth and sand onto the dump truck M3.

Figure 2:
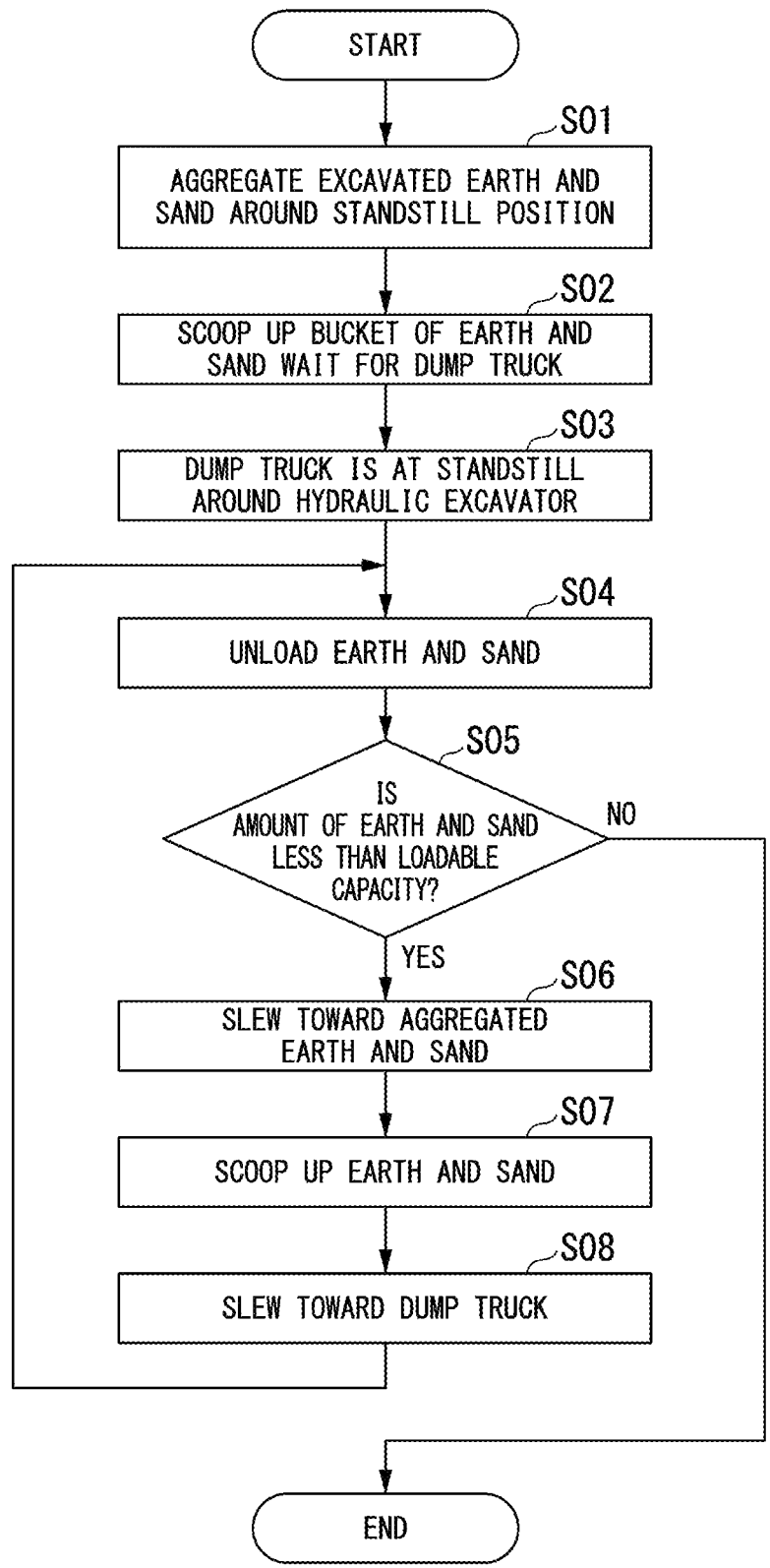
FIG. 2 is a flowchart showing an operation of loading work of a hydraulic excavator.

FIG. 2 is a flowchart showing an operation of loading work of the hydraulic excavator.

An operator of the hydraulic excavator M1 aggregates excavated earth and sand around a standstill position of the dump truck M3 in advance before the dump truck M3 arrives (step S01). The operator of the hydraulic excavator M1 scoops up a bucket of earth and sand with the hydraulic excavator M1 before the dump truck M3 arrives (step S02). In a case where there is no margin in work time, the work in steps S01 and S02 may be omitted. In a case where the dump truck M3 reaches a predetermined loading region of the earth cut location G1, the dump truck M3 is at a standstill around the hydraulic excavator M1 (step S03). Next, the operator of the hydraulic excavator M1 unloads the scooped-up earth and sand to a dump body of the dump truck M3 (step S04). The operator of the hydraulic excavator M1 estimates whether or not an amount of earth and sand loaded on the dump truck M3 is less than a loadable capacity of the dump truck M3 (step S05). In a case where it is determined that the amount of earth and sand loaded on the dump truck M3 is less than the loadable capacity of the dump truck M3 (step S05: YES), the operator of the hydraulic excavator M1 slews an upper slewing body of the hydraulic excavator M1 toward aggregated earth and sand or earth and sand to be excavated (step S06). The operator of the hydraulic excavator M1 scoops up the aggregated earth and sand or the excavated earth and sand with the hydraulic excavator M1 (step S07). Next, the operator of the hydraulic excavator M1 slews the upper slewing body of the hydraulic excavator M1 toward the dump truck M3 (step S08), and unloads the earth and sand in the same manner as in the process in step S4. This is repeatedly executed, and thus the operator of the hydraulic excavator M1 can load earth and sand up to the loadable capacity of the dump truck M3. In a case where it is determined that an amount of earth and sand loaded on the dump truck M3 reaches the loadable capacity of the dump truck M3 (step S05: NO), the operator of the hydraulic excavator M1 finishes the loading work of the hydraulic excavator M1.

The hydraulic excavator M1 disposed in the earth cut location G1 may shape a slope in the earth cut location G1. The operator of the hydraulic excavator M1 causes the hydraulic excavator M1 to come close to a slope region designed as a slope, and shapes earth and sand on a surface of the slope region with a bucket while moving in an extending direction of the slope. Hereinafter, the hydraulic excavator M1 for slope shaping work will be referred to as a slope excavator in some cases.

The bulldozer M2 disposed in the earth cut location G1 excavates and transports earth and sand in the earth cut location G1. An operator of the bulldozer M2 moves the bulldozer M2 forward in a state in which a position of a blade of the bulldozer M2 is adjusted, and can thus excavate earth and sand with the bulldozer M2. The bulldozer M2 disposed in the earth cut location G1 compacts a ground after excavation. The operator of the bulldozer M2 causes the bulldozer M2 in a state in which the blade of the bulldozer M2 is raised, and can thus compact the ground with the bulldozer M2. A traveling speed of the bulldozer M2 during compaction is higher than a traveling speed during excavation.

The dump truck M3 transports the earth and sand loaded in the earth cut location G1 to the banking location G2. In a case where the dump truck M3 unloads the earth and sand in the banking location G2, the dump truck M3 is moved from the banking location G2 to the earth cut location G1. A traveling speed of the dump truck M3 differs between when the dump truck is loaded with earth and sand and when the dump truck is not loaded therewith.

A traveling speed of the dump truck M3 differs between when the dump truck is traveling inside the banking location G2 or the earth cut location G1 and when the dump truck is traveling on the traveling path G3 which is outside the locations.

In a case where the dump truck M3 is at a standstill at a standstill position in each of the earth cut location G1 and the banking location G2, an operator of the dump truck M3 turns the dump truck M3, and causes the dump truck M3 to travel backward and thus to be at a standstill at the standstill position.

The hydraulic excavator M1 disposed in the banking location G2 heaps up the earth and sand unloaded from the dump truck M3 in the banking location G2. In this case, in the same manner as the hydraulic excavator M1 disposed in the earth cut location G1, the hydraulic excavator M1 disposed in the banking location G2 repeatedly executes processes of directing an upper slewing body thereof toward the unloaded earth and sand, scooping up the earth and sand, slewing the upper slewing body to a location where the earth and sand are to be spread, and unloading the earth and sand at the location where the earth and sand are to be spread.

The hydraulic excavator M1 disposed in the banking location G2 may shape a slope in the banking location G2.

The bulldozer M2 disposed in the banking location G2 lays and levels the earth and sand transported by the dump truck M3 in the banking location G2. Specifically, the bulldozer M2 uniformly lays and levels earth and sand discharged by the dump truck M3 or the like in a region in which the earth and sand are to be laid and leveled. In the laying-leveling work, a height of earth and sand to be laid in one time, that is, a height of a landform to be heaped up more than before laying and leveling is defined depending on a situation of the construction site G or by an operator. In order to lay and level discharged earth and sand by a predetermined height, the bulldozer M2 sets its blade at a predetermined height, and then performs the laying-leveling work. The laying-leveling work is repeatedly performed a plurality of times until a region where earth and sand are to be laid and leveled reaches a target height.

Figure 3:
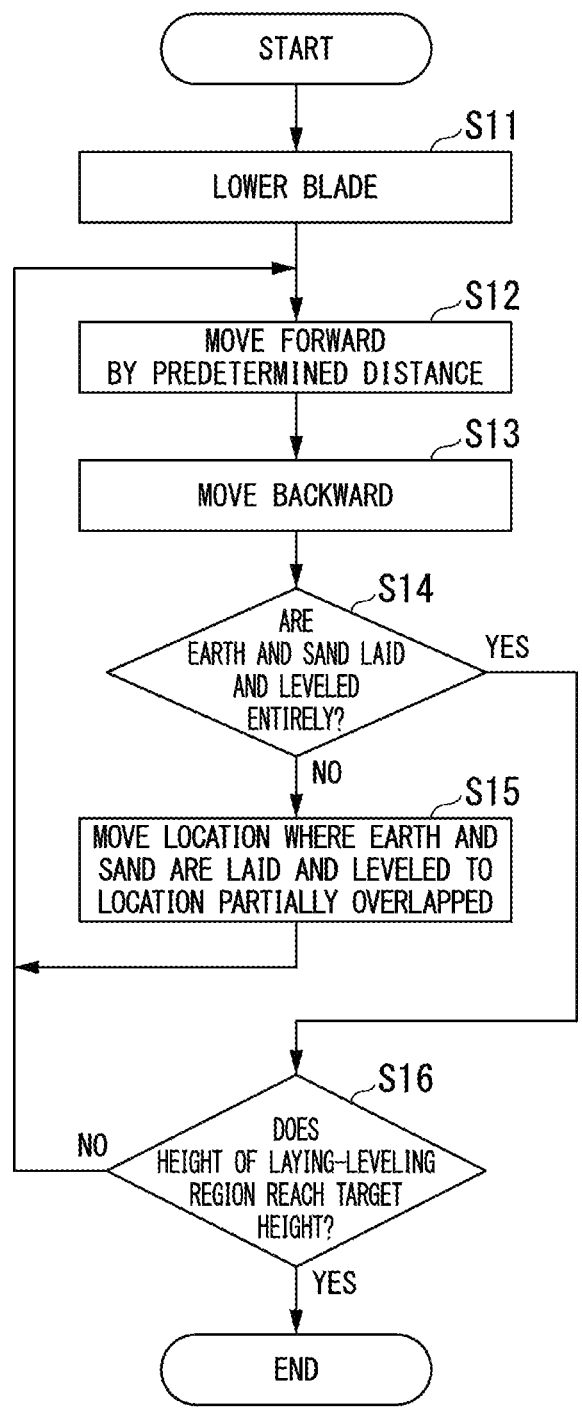
FIG. 3 is a flowchart showing an operation of laying-leveling work of a bulldozer.

FIG. 3 is a flowchart showing an operation of laying-leveling work of the bulldozer.

In a case where earth and sand are spread by the dump truck M3 in a region where the earth and sand are to be laid and leveled, the operator of the bulldozer M2 lowers the blade of the bulldozer M2 to any height (step S11). A height of earth and sand to be laid and leveled is determined by the height of the blade.

Next, the operator of the bulldozer M2 moves the bulldozer M2 forward in the laying-leveling region, so as to level the earth and sand (step S12).

The bulldozer M2 is moved forward once, and thus the earth and sand can be laid and leveled up to the front by a predetermined distance (for example, about 10 meters). In a case where the bulldozer M2 is moved forward by the predetermined distance, the operator of the bulldozer M2 moves the bulldozer M2 backward (step S13). The operator of the bulldozer M2 determines whether or not the earth and sand are laid and leveled in the entire laying-leveling region with the bulldozer M2 (step S14).

In a case where there is a location were earth and sand are not laid and leveled (step S14: NO), the operator of the bulldozer M2 moves the bulldozer M2 such that the blade is adjusted to a position which include the location where earth and sand are not laid and leveled and partially overlaps a location where earth and sand are already laid and leveled (step S15).

For example, the operator of the bulldozer M2 moves the bulldozer M2 obliquely backward during backward movement in step S13. The flow returns to the process in step S12, and forward movement and backward movement are repeated until earth and sand are laid and leveled in the entire laying-leveling region.

In a case where it is determined that earth and sand are laid and leveled in the entire laying-leveling region (step S14: YES), the operator of the bulldozer M2 determines whether or not a height of the laying-leveling region reaches the target height (step S16). In a case where it is determined that the height of the laying-leveling region does not reach the target height (step S16: NO), the flow returns to the process in step S12, and forward movement and backward movement are repeated until the height of the laying-leveling region reaches the target height. On the other hand, in a case where it is determined that the height of the laying-leveling region reaches the target height (step S16: YES), the operator of the bulldozer M2 finishes the laying-leveling work of the bulldozer M2.

The bulldozer M2 disposed in the banking location G2 may compact the ground. The operator of the bulldozer M2 raises the blade of the bulldozer M2, causes the bulldozer M2 to travel, and can thus compact the ground with a crawler of the bulldozer M2. A traveling speed of the bulldozer M2 during compaction is higher than a traveling speed during laying-leveling work.

<<Configuration of Simulation System>>

Figure 4:
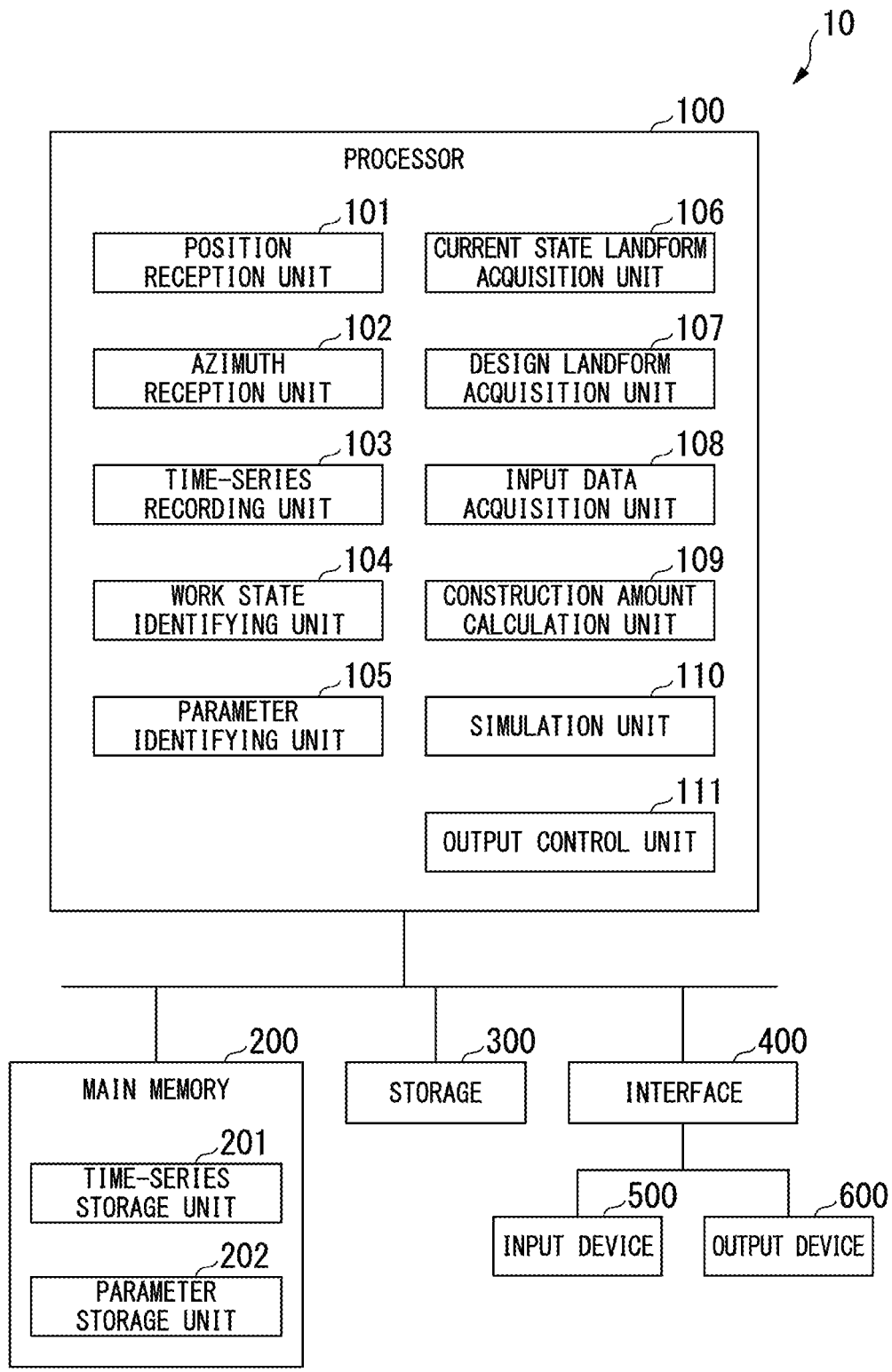
FIG. 4 is a schematic block diagram showing a configuration of a simulation system according to the first embodiment.

FIG. 4 is a schematic block diagram showing a configuration of a simulation system according to the first embodiment.

A simulation system 10 identifies a parameter of each work machine M in the construction site G, and simulates construction in the construction site G by using the parameters. In other words, the simulation system 10 is an example of a parameter identifying device.

The simulation system 10 is a computer including a processor 100, a main memory 200, a storage 300, and an interface 400. The storage 300 stores a program. The processor 100 reads the program from the storage 300, develops the program to the main memory 200, and executes processes according to the program. The simulation system 10 is connected to a network via the interface 400. The simulation system 10 is connected to an input device 500 and an output device 600 via the interface 400. Examples of the input device 500 may include a keyboard, a mouse, and a touch panel. Examples of the output device 600 may include a monitor, a speaker, and a printer.

Examples of the storage 300 may include a hard disk drive (HDD), a solid state drive (SSD), a magnetic disk, a magneto-optical disc, a compact disc read only memory (CD-ROM), a digital versatile disc read only memory (DVD-ROM), and a semiconductor memory. The storage 300 may be an internal medium which is directly connected to a bus of the simulation system 10, and may be an external medium which is connected to the simulation system 10 via the interface 400. The storage 300 is a non-transitory storage medium.

The processor 100 functions as a position reception unit 101, an azimuth reception unit 102, a time-series recording unit 103, a work state identifying unit 104, a parameter identifying unit 105, a current status landform acquisition unit 106, an output control unit 111, a design landform acquisition unit 107, an input data acquisition unit 108, a construction amount calculation unit 109, a simulation unit 110, and an output control unit 111, according to the execution of the program.

The processor 100 secures storage regions of a time-series storage unit 201 and a parameter storage unit 202 in the main memory 200 according to execution of the program.

The position reception unit 101 receives position data of each work machine M disposed in the construction site G every predetermined time. The position data of the work machine M may be received from a computer of the work machine M, and may be received from a computer carried by the work machine M. An example of the computer carried on the work machine M may be a portable terminal.

The azimuth reception unit 102 receives azimuth data of each work machine M disposed in the construction site G every predetermined time. The azimuth data of the work machine M may be received from a computer of the work machine M, and may be received from a computer carried by the work machine M. In a case where the computer carried by the work machine M transmits the azimuth data, the computer is fixed to the work machine M such that the computer is not rotated. The azimuth data includes not only output data from a sensor such as an electronic compass or a geomagnetic sensor but also detection (including PPC pressure) of a slewing lever operation, or a detection result in a gyro sensor or an angle sensor of an upper slewing body. In other words, the azimuth reception unit 102 may identify an azimuth of the work machine M by integrating an instantaneous change amount of the azimuth. The azimuth data may be detected by a sensor provided in the work machine M or a sensor provided outside of the work machine M. The sensor may be a sensor, for example, by detecting azimuth data through image analysis using a motion sensor or a camera.

The time-series recording unit 103 stores the position data received by the position reception unit 101 and the azimuth data received by the azimuth reception unit 102 into the time-series storage unit 201 in association with an ID of the work machine M and reception time points thereof. FIG. 5 is a diagram showing data stored in the time-series storage unit. Consequently, the time-series storage unit 201 stores a time series of position data of each work machine M and a time series of azimuth data of each work machine M. The time series of the position data and the azimuth data may be an aggregate of position and azimuth data every predetermined time, and may be an aggregate of position and azimuth data at an irregular time.

The work state identifying unit 104 identifies the work state of each work machine M on the basis of a time series of position data and a time series of azimuth data stored in the time-series storage unit 201, and a time series of traveling speeds. Examples of the work state of the work machine M may include the type of work executed by the work machine M, a location where the work machine M is located, and a traveling direction (forward movement or backward movement) of the work machine M.

The type of work of the hydraulic excavator M1 may include excavation work, loading work, banking work, spreading work, and slope shaping work. The excavation work is work of excavating earth and sand of the construction site G. The loading work is work of loading excavated earth and sand onto the dump truck M3. The banking work is work of heaping up and compacting earth and sand discharged by the dump truck M3 on the construction site G. The spreading work is work of scattering and spreading earth and sand discharged by the dump truck M3 on the construction site G. The slope shaping work is shaping work of excavating and shaping a slope region in the construction site G in accordance with design landform data.

The type of work of the bulldozer M2 may include excavation-transport work, laying-leveling work, and compaction work. The excavation-transport work is work of excavating and transporting earth and sand of the construction site G with the blade. The laying-leveling work is work of laying and leveling earth and sand discharged by the dump truck M3 at a predetermined height. The compaction work is shaping work of compacting earth and sand of the construction site G with the crawler.

The type of work of the dump truck M3 may include unloaded traveling, loaded traveling, loading work, and discharge work. The unloaded traveling is work of traveling in a state in which there are no earth and sand in the dump body. The loaded traveling is work of traveling in a state in which there are earth and sand in the dump body. The loading work is standby work while earth and sand are loaded into the dump body by the hydraulic excavator M1. The discharge work is work of unloading earth and sand loaded in the dump body.

The work state identifying unit 104 identifies whether a traveling state of the bulldozer M2 is forward movement or backward movement. The work state identifying unit 104 identifies whether the dump truck M3 is located in the earth cut location G1 or the banking location G2 and whether the dump truck is being turned or moved backward, as a traveling state of the dump truck. The traveling state is an example of the work state.

The parameter identifying unit 105 identifies a parameter (basic unit data used for simulation) related to a work state for each work state identified by the work state identifying unit 104 on the basis of the time series stored in the time-series storage unit 201. The parameter identifying unit 105 stores the identified parameter into the parameter storage unit 202.

Specifically, the parameter identifying unit 105 identifies a required time, the number of cycles, and a ratio (bucket coefficient) of excavated earth and sand to a bucket capacity in the loading work of the hydraulic excavator M1. Here, the number of cycles indicates the number of times of repetition of the processes from step S04 to step S08 in the flow shown in FIG. 2, that is, the processes of scooping up earth and sand and loading the earth and sand onto the dump truck M3. Hereinafter, the processes from step S04 to step S08 being executed once will be referred to as one cycle in some cases. The time required for processes of one cycle will be referred to as one cycle time. The parameter identifying unit 105 identifies a shaping area and a shaping earth amount per unit time in the slope shaping work of the hydraulic excavator M1. The shaping area and the shaping earth amount per unit time in the slope shaping work of the hydraulic excavator M1 are examples of a work amount per unit time of the work machine M.

The parameter identifying unit 105 identifies a forward speed and a backward speed during the excavation-transport work of the bulldozer M2, a forward speed and a backward speed during the laying-leveling work, and a speed during the compaction work. The parameter identifying unit 105 identifies a shaping area and a shaping earth amount per unit time in the laying-leveling work of the bulldozer M2, and a height of the blade (a height from the ground surface to a lower end of the blade, or a laying-leveling height). The shaping area and the shaping earth amount per unit time in the laying-leveling work of the bulldozer M2 are examples of a work amount per unit time of the work machine M.

The parameter identifying unit 105 identifies a traveling speed during unloaded traveling of the dump truck M3 outside the locations, traveling speed during loaded traveling outside the locations, a turning speed inside the location, and a backward movement speed inside the location.

The current status landform acquisition unit 106 acquires current status landform data representing a current status landform of the construction site G. The current status landform data is three-dimensional data, and includes position data in a global coordinate system. The current status landform data is generated on the basis of, for example, aerial image data captured by a drone provided with a camera. The current status landform data may be generated on the basis of image data captured by the work machine M with a stereo camera.

The design landform acquisition unit 107 acquires design landform data representing a design landform of the construction site G. The design landform data is three-dimensional data, and includes position data in a global coordinate system. The design landform data includes landform type data indicating the type of landform. The design landform data is created by, for example, three-dimensional CAD.

The input data acquisition unit 108 receives input of various pieces of data used for simulation of the construction site G. For example, the input data acquisition unit 108 receives input of the type of work machine M, a vehicle rank and gas mileage of the work machine M, and the number of work machines M as simulation parameters. The input data acquisition unit 108 receives input of construction condition data representing procedures of construction, for example, according to what procedure loading work is performed by using the hydraulic excavator M1 and the dump truck M3.

The construction amount calculation unit 109 compares and collates current status landform data with target landform data, and thus calculates construction amount data representing a construction amount in the construction site G. Specifically, the construction amount calculation unit 109 calculates a difference between the current status landform data and the target landform data as the construction amount data.

The simulation unit 110 simulates construction in the construction site G on the basis of the parameters identified by the parameter identifying unit 105, the data acquired by the input data acquisition unit 108, and the construction amount data calculated by the construction amount calculation unit 109.

The output control unit 111 outputs the parameters identified by the parameter identifying unit 105, and an output signal indicating a simulation result in the simulation unit 110, to the output device 600.

<<Identification of Parameter in Simulation System>>

Figure 6:
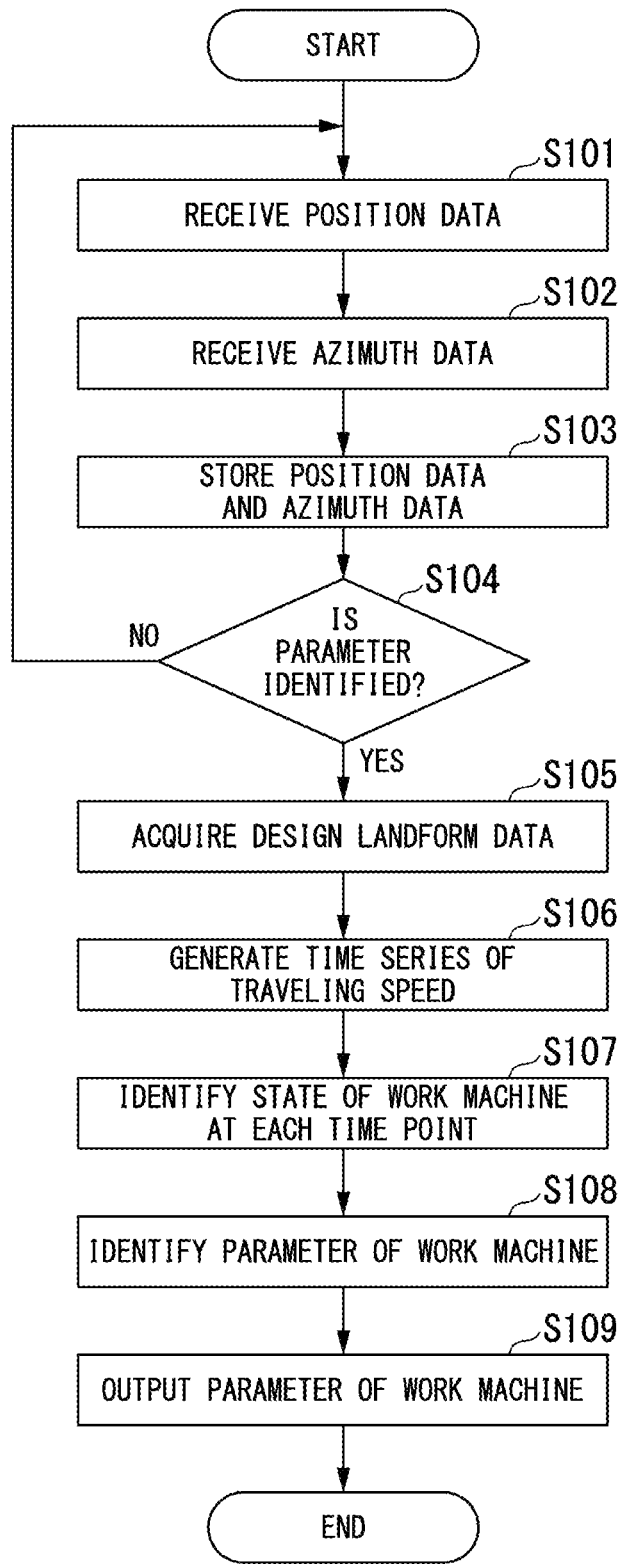
FIG. 6 is a flowchart showing a parameter identifying method according to the first embodiment.

Next, a description will be made of an operation of the simulation system 10 according to the first embodiment. FIG. 6 is a flowchart showing a parameter identifying method according to the first embodiment.

In order to identify a parameter of the work machine M, the simulation system 10 regularly collects position data and azimuth data from each work machine M during an operation of the work machine M in the construction site G, and generates time-series data in advance.

A computer mounted on each work machine M or a computer carried by each work machine M (hereinafter, referred to as a computer of the work machine M) measures a position and an azimuth of the work machine M every predetermined time. The computer of the work machine M transmits position data indicating the measured position and azimuth data indicating the measured azimuth to the simulation system 10. The position of the work machine M is identified by a global navigation satellite system (GNSS) such as a global positioning system (GPS). The azimuth of the work machine M is identified by, for example, an electronic compass provided in the work machine M or the computer of the work machine M.

The position reception unit 101 of the simulation system 10 receives the position data from the computer of the work machine M (step S101). The azimuth reception unit 102 receives the azimuth data from the computer of the work machine M (step S102). The time-series recording unit 103 stores the received position data and azimuth data into the time-series storage unit 201 in association with reception time points and an ID of the work machine M related to the computer which is a reception source (step S103). The simulation system 10 determines whether or not a parameter identifying process is started due to a user's operation or the like (step S104).

In a case where the parameter identifying process is not started (step S104: NO), the simulation system 10 repeatedly executes the processes from step S101 to step S103 until the parameter identifying process is started, and thus a time series of position data and azimuth data is formed in the time-series storage unit 201.

In a case where the parameter identifying process is started (step S104: YES), the design landform acquisition unit 107 acquires design landform data (step S105). The work state identifying unit 104 calculates a traveling speed of each work machine M at each time point on the basis of the time series of position data of each work machine M stored in the time-series storage unit 201 (step S106). In other words, the work state identifying unit 104 generates a time series of traveling speeds of each work machine M. The time series of traveling speeds may be acquired by using control area network (CAN) data of the work machine M. Next, the work state identifying unit 104 identifies the work state of each work machine M at each time point on the basis of the design landform data, and the position data, the azimuth data, and the time series of traveling speeds of the work machine M (step S107). The work state identifying unit 104 identifies a parameter of each work machine M in the identified work state on the basis of the position data, the azimuth data, and the time series of traveling speeds of the work machine M, and stores the parameter into the parameter storage unit 202 (step S108). The output control unit 111 outputs the parameter identified by the parameter identifying unit 105 to the output device 600 (step S109).

Here, a detailed description will be made of a method in which the work state identifying unit 104 identifies a work state in step S107.

<<Method of Identifying Work State of Hydraulic Excavator M1 Disposed in Earth Cut Location G1>>

Figure 7:
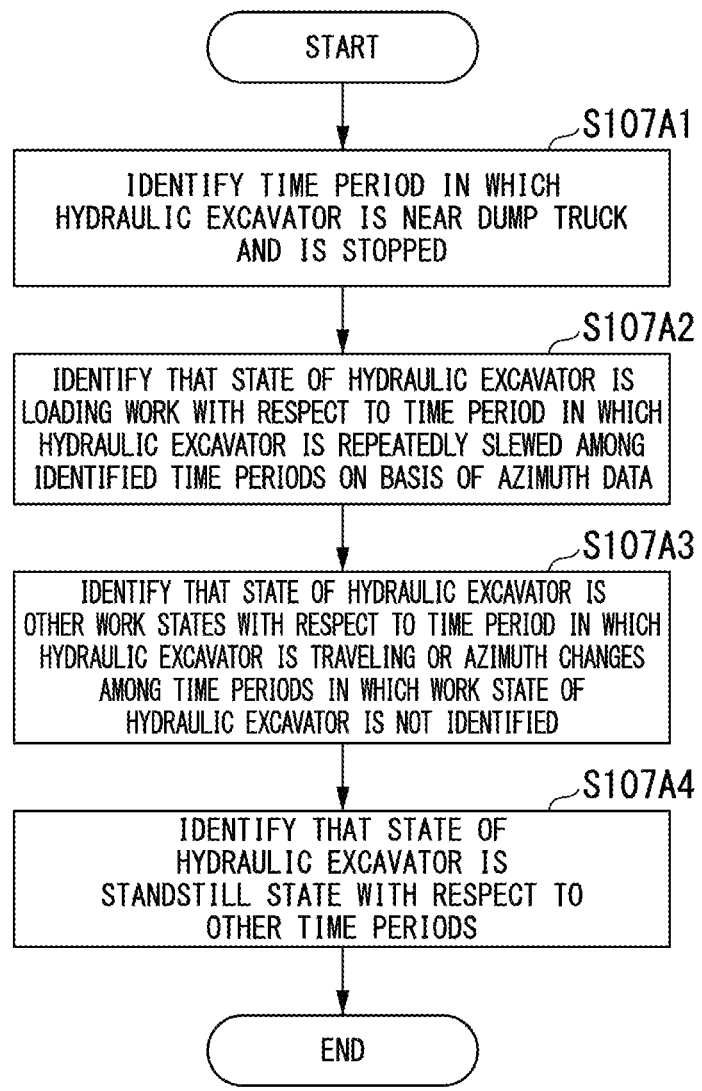
FIG. 7 is a flowchart showing a method of identifying a work state of a hydraulic excavator disposed in an earth cut location in the first embodiment.
Figure 8:
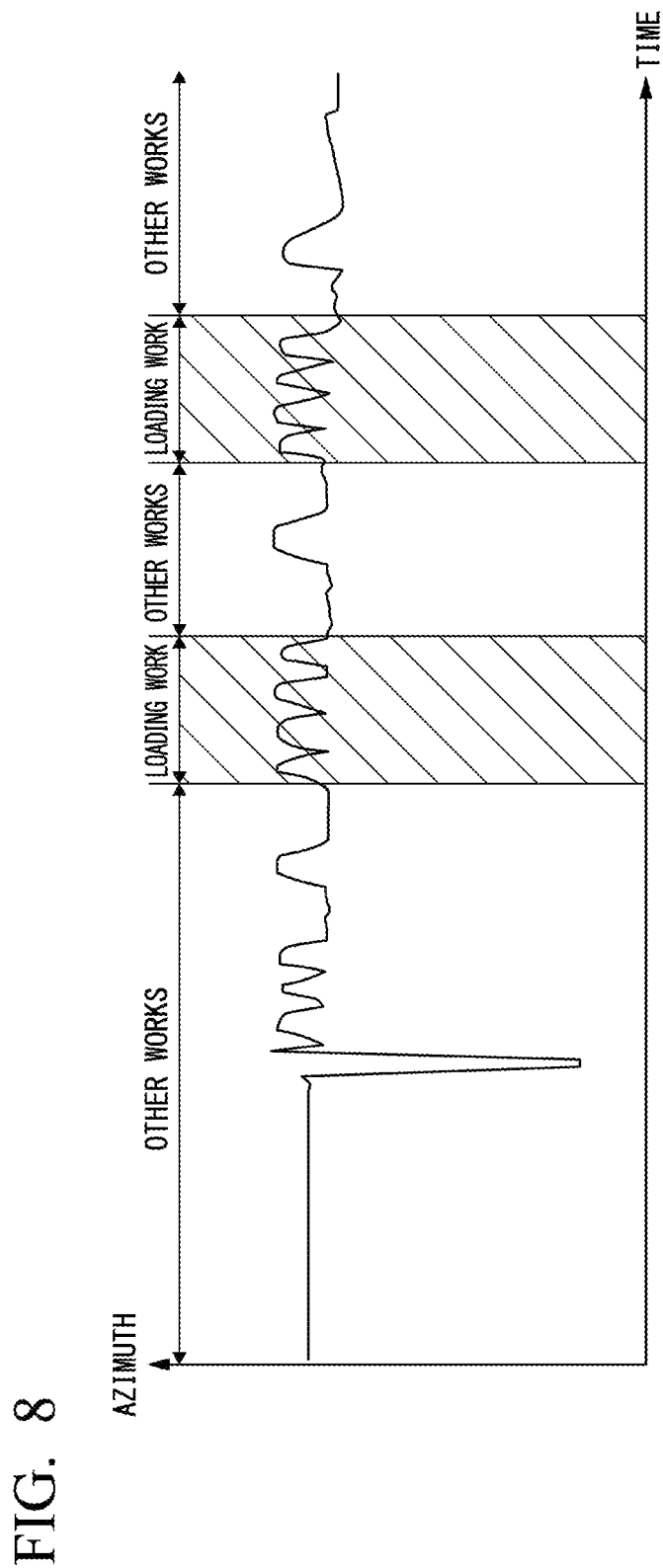
FIG. 8 is a diagram showing an example of time series of azimuth data of the hydraulic excavator.

FIG. 7 is a flowchart showing a method of identifying the work state of the hydraulic excavator disposed in the earth cut location in the first embodiment. FIG. 8 is a diagram showing an example of a time series of azimuth data of the hydraulic excavator.

The work state identifying unit 104 identifies time periods in which the dump truck M3 is located within a predetermined distance from the hydraulic excavator M1 disposed in the earth cut location G1, and the hydraulic excavator M1 and the dump truck M3 are stopped, on the basis of a time series of position data and a time series of traveling speeds (step S107A1). The work machine M "being stopped" indicates a work state in which the work machine M is not traveling. In other words, a state in which the work machine M is not traveling, and performs work such as excavation, slewing, raising and lowering a boom is also referred to as the work machine M "being stopped". On the other hand, a work state in which the work machine M is not traveling and also does not perform other work will be referred to as the work machine M "being at a standstill". Next, the work state identifying unit 104 identifies that a work state (the type of work) of the hydraulic excavator M1 is a loading work state with respect to a time period in which the hydraulic excavator M1 is repeatedly slewed among the identified time periods on the basis of a time series of azimuth data (step S107A2). The work state identifying unit 104 may determine that the hydraulic excavator M1 is repeatedly slewed, for example, in a case where slewing in which an azimuth of the hydraulic excavator consecutively changes in the same direction at an angle equal to or higher than a predetermined angle (for example, 10 degrees) is repeatedly performed a predetermined number of times or more among the identified time periods. This is because the cycle operation from step S04 to step S08 shown in FIG. 2 appears as a repeated change in an azimuth of the hydraulic excavator M1 as shown in FIG. 8. In FIG. 8, a hatched portion represents a time period in which a distance between the hydraulic excavator M1 and the dump truck M3 is within a predetermined distance. As shown in FIG. 8, the work state identifying unit 104 determines that the work state of the hydraulic excavator M1 is a loading work state in the time period in which a distance between the hydraulic excavator M1 and the dump truck M3 is within the predetermined distance, and repeated slewing is performed.

Next, the work state identifying unit 104 identifies that the work state of the hydraulic excavator M1 is other work states with respect to a time period in which the hydraulic excavator M1 is traveling or an azimuth of the hydraulic excavator M1 changes among time periods in which the work state of the hydraulic excavator M1 is not identified (step S107A3). The other work states include excavation work and work of aggregating earth and sand to be loaded.

Next, the work state identifying unit 104 identifies that the work state of the hydraulic excavator M1 is a standstill state with respect to the time period in which the work state of the hydraulic excavator M1 is not identified (step S107A4).

<<Method of Identifying Work State of Hydraulic Excavator M1 Disposed Banking Location G2>>

Figure 9:
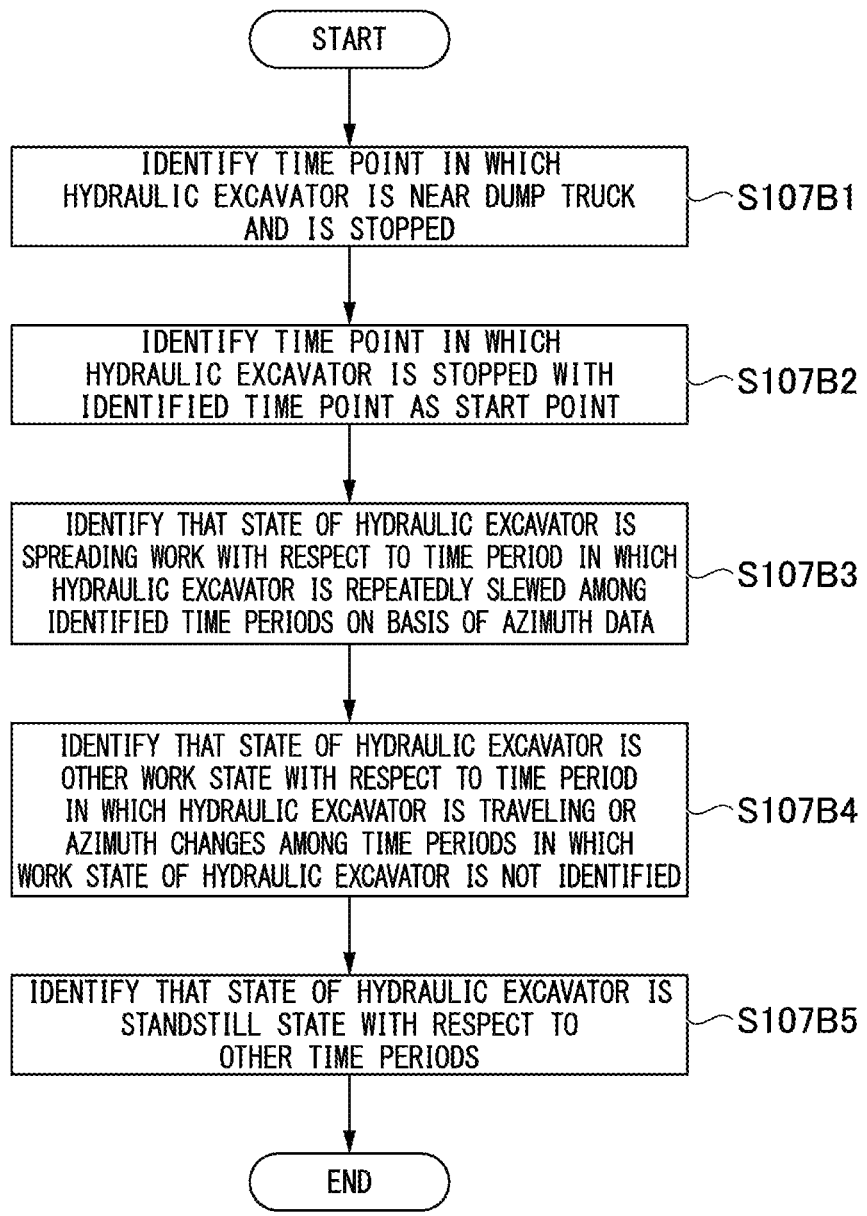
FIG. 9 is a flowchart showing a method of identifying the work state of a hydraulic excavator disposed in a banking location in the first embodiment.

FIG. 9 is a flowchart showing a method of identifying the work state of the hydraulic excavator disposed in the banking location G2 in the first embodiment.

The work state identifying unit 104 identifies a time point at which the dump truck M3 is located within a predetermined distance from the hydraulic excavator M1 disposed in the banking location G2, and the hydraulic excavator M1 and the dump truck M3 are stopped, on the basis of the time series of position data and the time series of traveling speeds (step S107B1). Next, the work state identifying unit 104 identifies a time point at which at least the hydraulic excavator M1 is stopped with the identified time point as a start point (step S107B2). The reason why position data of the dump truck M3 after the start point is not used is that, in a case where the dump truck M3 finishes discharge of earth and sand in the dump body thereof, the dump truck is moved to the earth cut location G1 regardless of the work state of the hydraulic excavator M1. Next, the work state identifying unit 104 identifies that a work state (the type of work) of the hydraulic excavator M1 is spreading work with respect to a time period in which the hydraulic excavator M1 is repeatedly slewed among the identified time periods on the basis of the time series of azimuth data (step S107B3).

Thereafter, the work state identifying unit 104 executes the processes in step S107B4 and step S107B5, and identifies one of the work state of the hydraulic excavator M1 being other work states and a standstill state with respect to a time period in which the work state of the hydraulic excavator M1 is not identified. The processes in step S107B4 and step S107B5 are the same as the processes in step S107A3 and step S107A4.

<<Method of Identifying Work State of Slope Excavator>>

Figure 10:
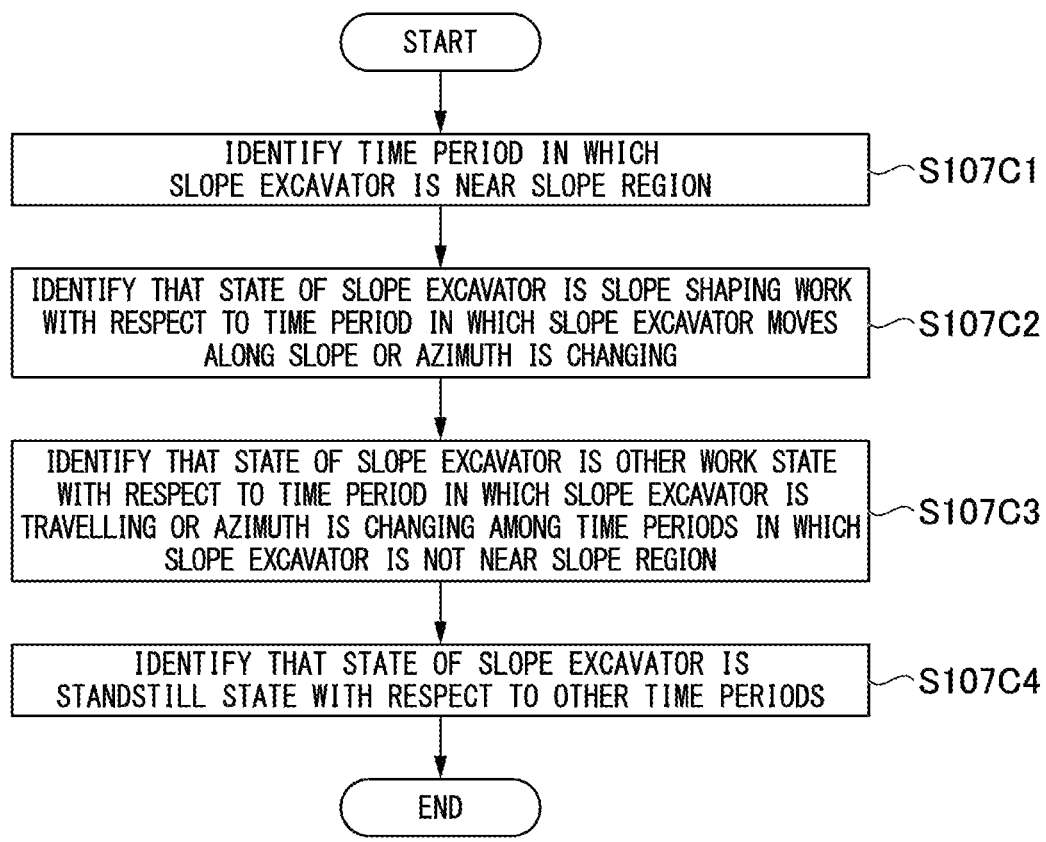
FIG. 10 is a flowchart showing a method of identifying the work state of a slope excavator in the first embodiment.

FIG. 10 is a flowchart showing a method of identifying the work state of a slope excavator in the first embodiment. The slope excavator indicates the hydraulic excavator M1 performing work of shaping a slope.

With respect to a slope excavator, the work state identifying unit 104 identifies time periods in which the slope excavator is located within a predetermined distance from a slope region of design landform data on the basis of a time series of position data and the design landform data acquired by the design landform acquisition unit 107 (step S107C1). The work state identifying unit 104 identifies that a work state (the type of work) of the slope excavator is slope shaping work with respect to a time period in which the slope excavator is being moved along a slope extending direction or an azimuth of the slope excavator is slewing among the identified time periods (step S107C2). The slope shaping work is work for the slope excavator to excavate and shape the slope region in the construction site in accordance with the design landform data.

Next, the work state identifying unit 104 identifies that the work state of the slope excavator is other work states with respect to a time period in which the slope excavator is traveling or an azimuth of the slope excavator is changing among time periods in which the work state of the slope excavator is not identified, that is, the slope excavator is not located within a predetermined distance from the slope region (step S107C3). Next, the work state identifying unit 104 identifies that the work state of the slope excavator is a standstill state with respect to the time periods in which the work state of the slope excavator is not identified (step S107C4).

<<Method of Identifying Work State of Bulldozer M2>>

Figure 11:
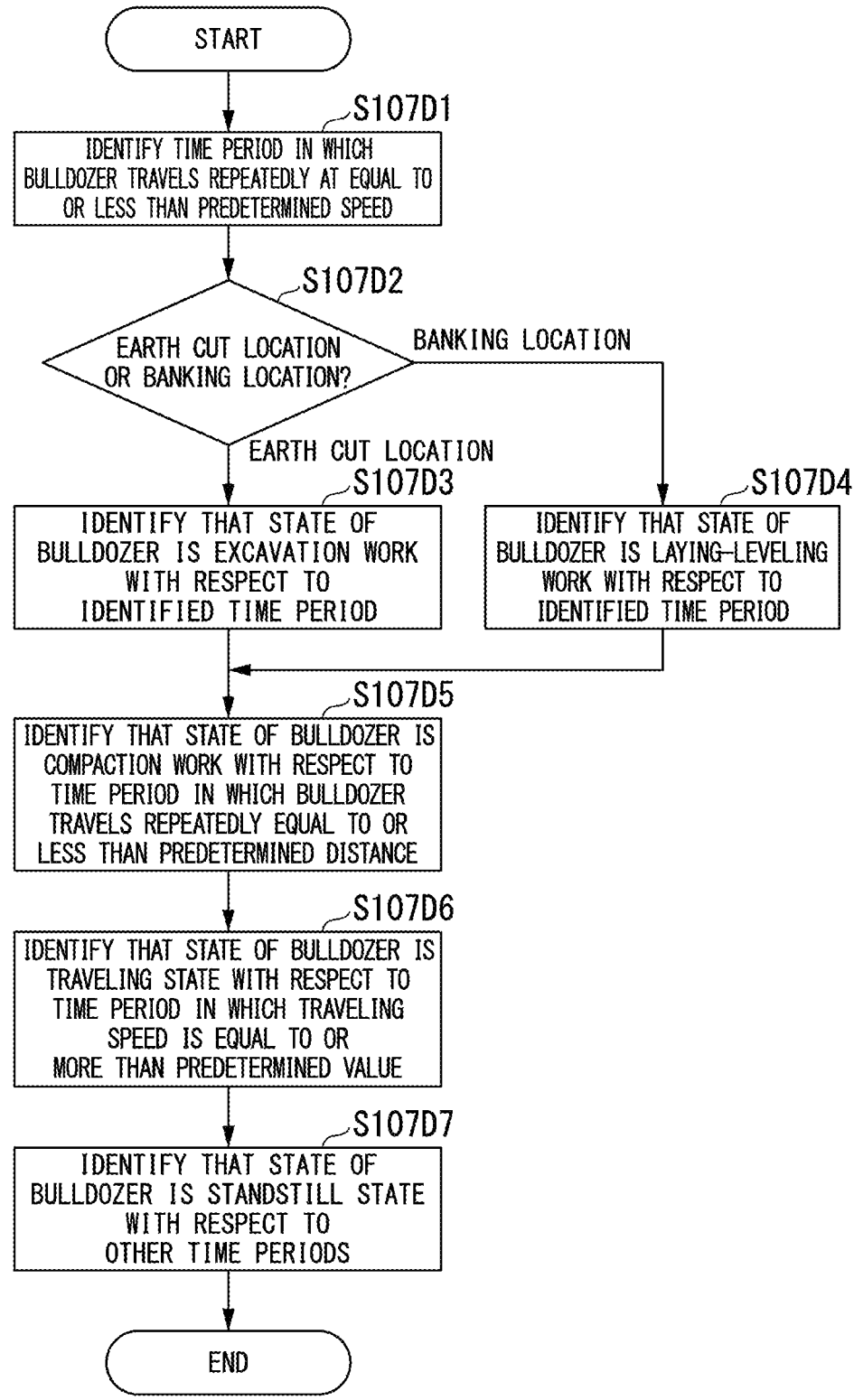
FIG. 11 is a flowchart showing a method of identifying the work state of a bulldozer in the first embodiment.

FIG. 11 is a flowchart showing a method of identifying the work state of the bulldozer in the first embodiment.

With respect to the bulldozer M2, the work state identifying unit 104 identifies time periods in which the bulldozer M2 is repeatedly moved forward and backward, and a speed during forward movement is equal to or lower than a predetermined speed (for example, 5 kilometers per hour), on the basis of a time series of position data and a time series of traveling speeds (step S107D1). Next, the work state identifying unit 104 determines whether the bulldozer M2 is disposed in the earth cut location G1 or the banking location G2 on the basis of the time series of position data (step S107D2). In a case where the bulldozer M2 is disposed in the earth cut location G1 (step S107D2: earth cut location), the work state identifying unit 104 identifies that a work state (the type of work) of the bulldozer M2 is excavation-transport work with respect to the identified time periods (step S107D3). On the other hand, in a case where the bulldozer M2 is disposed in the banking location G2 (step S107D2: banking location), the work state identifying unit 104 that a work state (the type of work) of the bulldozer M2 is laying-leveling work with respect to the identified time periods (step S107D4).

Next, the work state identifying unit 104 identifies that a work state (the type of work) of the bulldozer M2 is compaction work with respect to a time period in which the bulldozer M2 is repeatedly moved forward and backward in a predetermined distance (for example, 8 meters) or less among time periods in which the work state of the bulldozer M2 is not identified (step S107D5).

Next, the work state identifying unit 104 identifies that the work state of the bulldozer M2 is a traveling state with respect to a time period in which a traveling speed of the bulldozer M2 is equal to or more than a predetermined value among the time periods in which the work state of the bulldozer M2 is not identified (step S107D6).

Next, the work state identifying unit 104 identifies that the work state of the bulldozer M2 is a standstill state with respect to the time periods in which the work state of the bulldozer M2 is not identified (step S107D7).

The work state identifying unit 104 according to the first embodiment determines whether the type of work is excavation-transport work or laying-leveling work on the basis of a traveling speed of the bulldozer M2, but is not limited thereto. For example, in other embodiments, the work state identifying unit 104 may determine whether the type of work is excavation-transport work or laying-leveling work on the basis of both or one of repeated traveling distances and a traveling speed of the bulldozer M2.

The work state identifying unit 104 according to the first embodiment determines whether or not the type of work is compaction work on the basis of repeated traveling distances of the bulldozer M2, but is not limited thereto. For example, in other embodiments, the work state identifying unit 104 may determine whether or not the type of work is compaction work on the basis of both or one of repeated traveling distances and a traveling speed of the bulldozer M2.

Generally, a traveling speed in excavation-transport work and laying-leveling work is lower than a traveling speed in compaction work. Generally, a traveling distance in excavation-transport work and laying-leveling work is longer than a traveling distance in compaction work.

<<Method of Identifying Work State of Dump Truck M3>>

Figure 12:
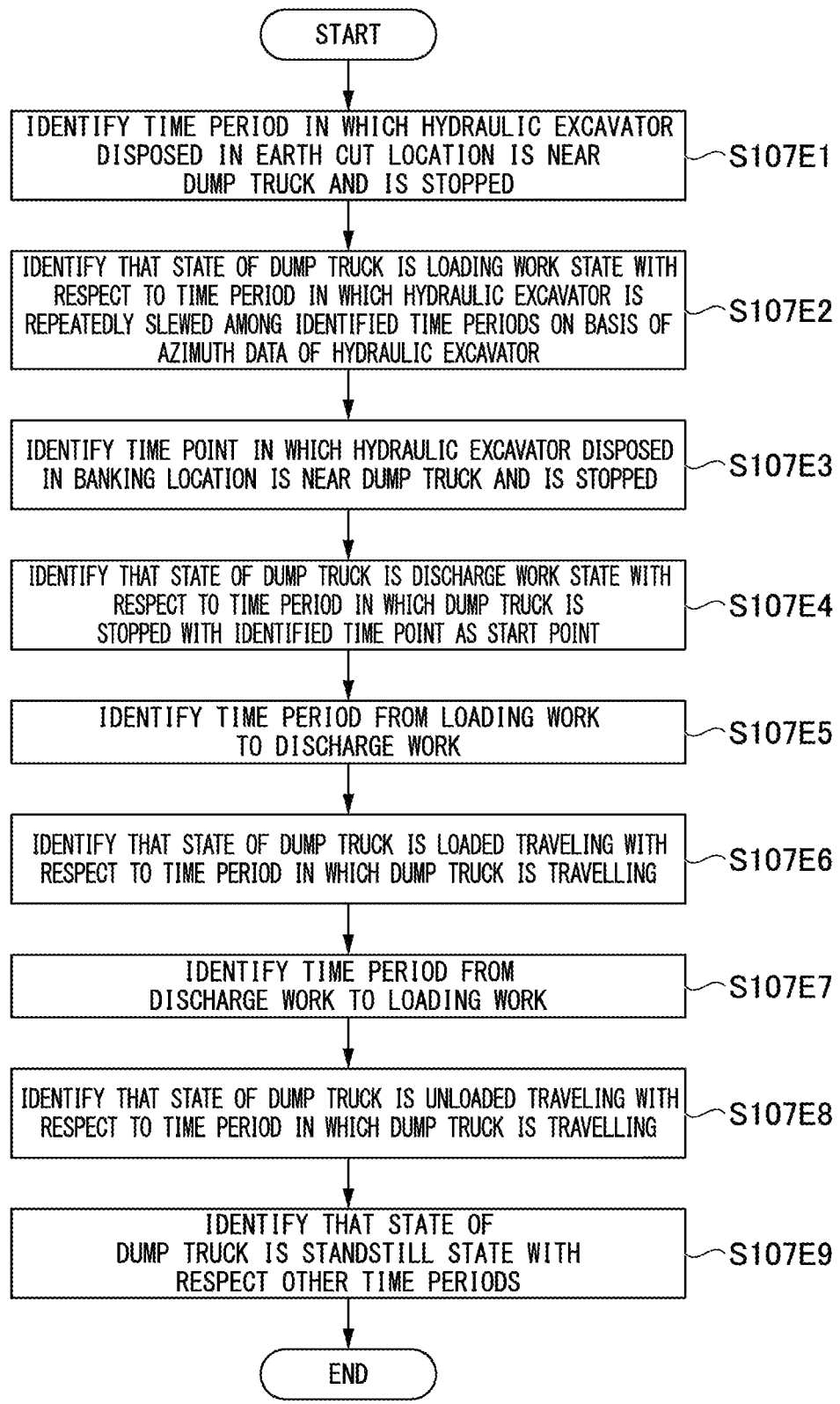
FIG. 12 is a flowchart showing a method of identifying the work state of a dump truck in the first embodiment.

FIG. 12 is a flowchart showing a method of identifying the work state of the dump truck in the first embodiment.

The work state identifying unit 104 identifies time periods in which the dump truck M3 is located within a predetermined distance from the hydraulic excavator M1 disposed in the earth cut location G1, and the hydraulic excavator M1 and the dump truck M3 are stopped, on the basis of a time series of position data and a time series of traveling speeds (step S107E1). Next, the work state identifying unit 104 identifies that a work state (the type of work) of the dump truck M3 located within a predetermined distance from the hydraulic excavator M1 is a loading work state with respect to a time period in which the hydraulic excavator M1 is repeatedly slewed among the identified time periods on the basis of a time series of azimuth data (step S107E2).

The work state identifying unit 104 identifies a time point at which the dump truck M3 is located within a predetermined distance from the hydraulic excavator M1 disposed in the banking location G2, and the hydraulic excavator M1 and the dump truck M3 are stopped, on the basis of a time series of position data and a time series of traveling speeds (step S107E3). Next, the work state identifying unit 104 identifies that a work state (the type of work) of the dump truck M3 is a discharge work state with respect to a time period in which at least the dump truck M3 is stopped with the identified time point as a start point (step S107E4).

The work state identifying unit 104 identifies a time period from an end time point of the loading work to a start time point of the discharge work among time periods in which, with respect to the dump truck M3, the loading work is not identified in step S107E2 and the discharge work is not identified in step S107E4 (step S107E5).

The work state identifying unit 104 identifies that a work state (the type of work) of the dump truck M3 is loaded traveling with respect to a time period in which the dump truck M3 is traveling among the identified time periods on the basis of a time series of traveling speeds (step S107E6). The work state identifying unit 104 identifies a time period from an end time point of the discharge work to a start time point of the loading work among the time periods in which loading work is not identified in step S107E2 and discharge work is not identified in step S107E4 with respect to the dump truck M3 (step S107E7).

The work state identifying unit 104 identifies that a work state (the type of work) of the dump truck M3 is unloaded traveling with respect to a time period in which the dump truck M3 is traveling among the identified time periods on the basis of a time series of traveling speeds (step S107E8). In other embodiments, the work state identifying unit 104 may further determine whether the work state of the dump truck M3 immediately before a loading work state or a discharge work state is any one of turning traveling, backward traveling, and inside-location traveling, on the basis of a traveling speed, a traveling direction, and the like of the dump truck M3. For example, in a case where a traveling speed is low, the work state identifying unit 104 may identify that the work state of the dump truck M3 is inside-location traveling. For example, in a case where a traveling direction is a backward direction, the work state identifying unit 104 may identify that the work state of the dump truck M3 is backward traveling.

Next, the work state identifying unit 104 identifies that the work state of the dump truck M3 is a standstill state with respect to a time period in which the work state of the dump truck M3 is not identified (step S107E9).

Figure 13:
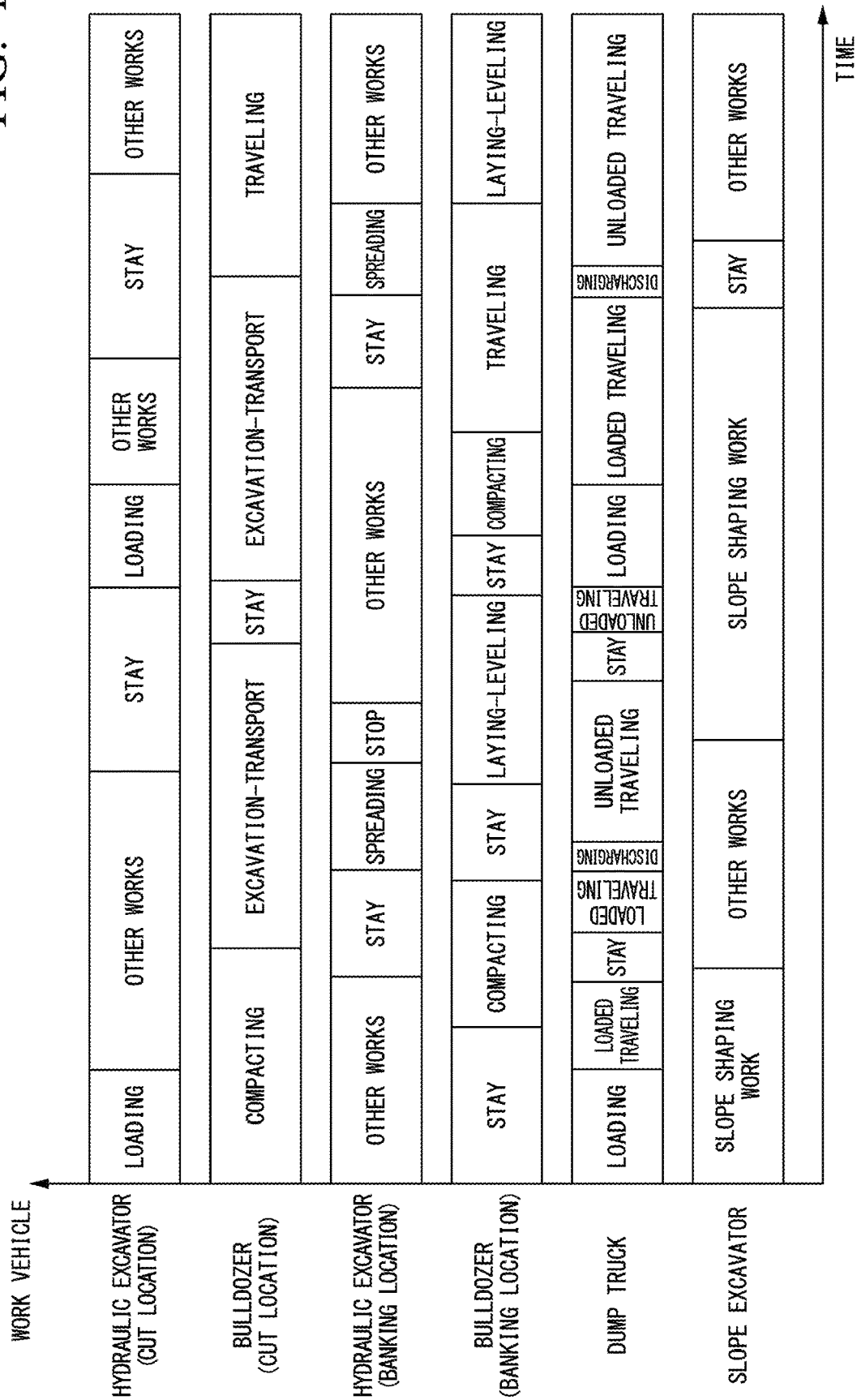
FIG. 13 is a time chart showing a change in a work state identified by a work state identifying unit.

FIG. 13 is a time chart showing a change in the work state identified by the work state identifying unit.

Through the process in step S107, the work state identifying unit 104 can identify the work state of each work machine M in each time period as shown in FIG. 13. As shown in FIG. 13, time charts of different work machines M are displayed to be arranged, and thus a manager or the like can recognize movement in the entire construction site G.

A detailed description will be made of a method in which the parameter identifying unit 105 identifies a parameter in step S108.

<<Parameter of Hydraulic Excavator M1>>

Figure 14:
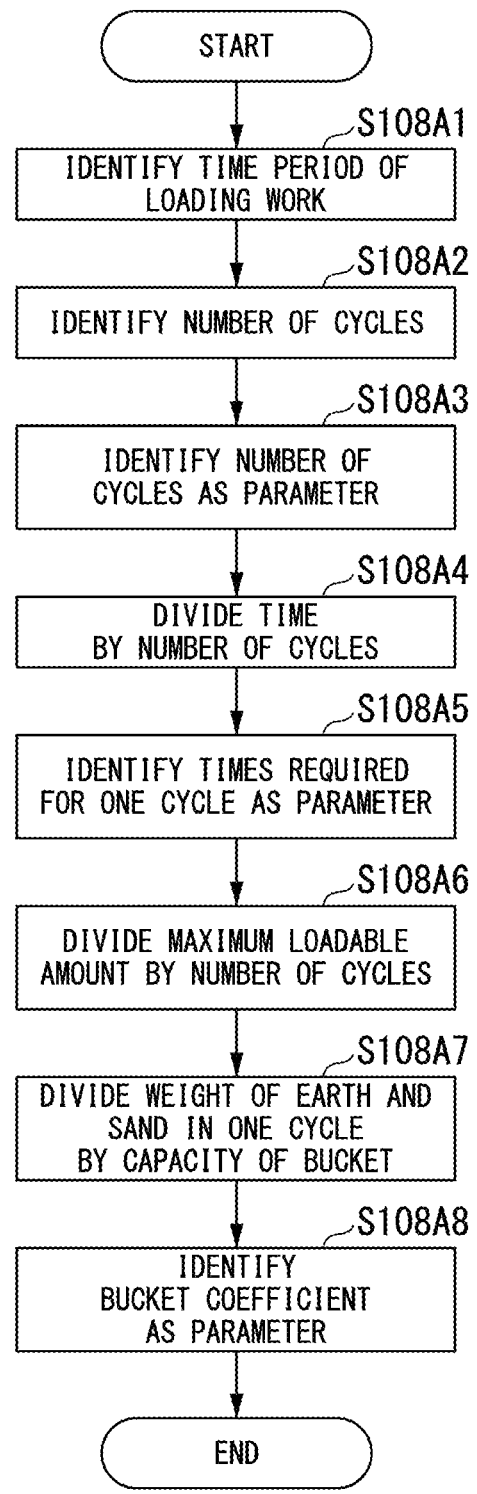
FIG. 14 is a flowchart showing a method of identifying a parameter of the hydraulic excavator in the first embodiment.

FIG. 14 is a flowchart showing a method of identifying a parameter of the hydraulic excavator in the first embodiment.

The parameter identifying unit 105 identifies time periods in which the work state of the hydraulic excavator M1 is loading work (step S108A1). The parameter identifying unit 105 identifies the number of times of repetition of slewing (number of cycles) for each of the identified time periods on the basis of a time series of azimuth data of the hydraulic excavator M1 (step S108A2). For example, the parameter identifying unit 105 may identify a value obtained by dividing the number of times in which a change direction of azimuth data is inverted (the number of pole values of the azimuth data) by two, as the number of times of repetition. Next, the parameter identifying unit 105 identifies an average value of the number of cycles in the respective time periods as a parameter related to the loading work or a parameter related to a work amount (step S108A3). The number of cycles indicates the number of times in which the hydraulic excavator M1 scoops up earth and sand in order to load the earth and sand onto a single dump truck M3 up to the maximum loadable amount.

With respect to each time period, the parameter identifying unit 105 calculates the time required for one cycle by dividing a time related to the time period by the number of cycles in the time period (step S108A4). The parameter identifying unit 105 identifies an average value of times required for one cycle in the respective time periods, as a parameter related to the loading work or a parameter related to a work amount (step S108A5).

With respect to each time period, the parameter identifying unit 105 divides the maximum loadable amount of the dump truck M3 (a value obtained by subtracting an empty vehicle weight, a fuel weight, the weight of an operator, and the like from the maximum total vehicle weight of the dump truck M3) by the number of cycles in the time period, so as to calculate the weight of earth and sand in one cycle (step S108A6). The maximum loadable amount may be identified on the basis of a design value of the dump truck M3, and may be identified on the basis of measurement of the weight of the dump truck M3. The parameter identifying unit 105 converts the calculated weight of earth and sand in one cycle into a volume on the basis of soil or the like, divides the volume by the capacity of the bucket, and thus identifies a ratio (bucket coefficient) of the capacity of earth and sand to the bucket capacity (step S108A7). The parameter identifying unit 105 identifies an average value of bucket coefficients in the respective time periods as a parameter related to the loading work or a parameter related to a work amount (step S108A8).

<<Parameter of Slope Excavator>>

Figure 15:
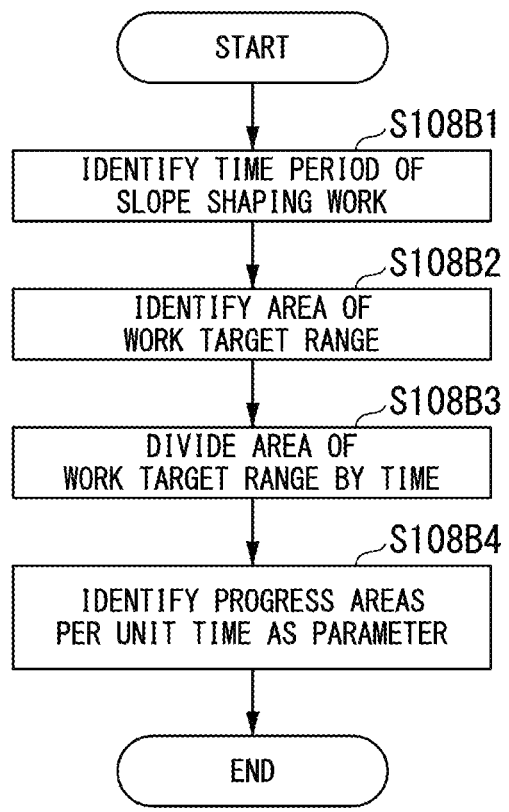
FIG. 15 is a flowchart showing a method of identifying a parameter of the slope excavator in the first embodiment.

FIG. 15 is a flowchart showing a method of identifying a parameter of the slope excavator in the first embodiment.

The parameter identifying unit 105 identifies time periods in which the work state of the slope excavator is slope shaping work (step S108B1). The parameter identifying unit 105 identifies an area of a range which is a work target of the slope excavator in each time period on the basis of design landform data and a time series of position data (step S108B2). For example, the parameter identifying unit 105 trims a slope region approached by the slope excavator in each time period in the design landform data on the basis of a position of the slope excavator at a start point of a time period and a position of the slope excavator at an end point of the time period, so as to identify an area of the range which is a work target. With respect to each time period, the parameter identifying unit 105 divides the area of the range which is a work target by a time related to the time period, and thus identifies a progress area per unit time (step S108B3). The parameter identifying unit 105 identifies an average value of progress areas per unit time in the respective time periods as a parameter related to the slope shaping work or a parameter related to a work amount (step S108B4).

<<Parameter of Bulldozer M2>>

Figure 16:
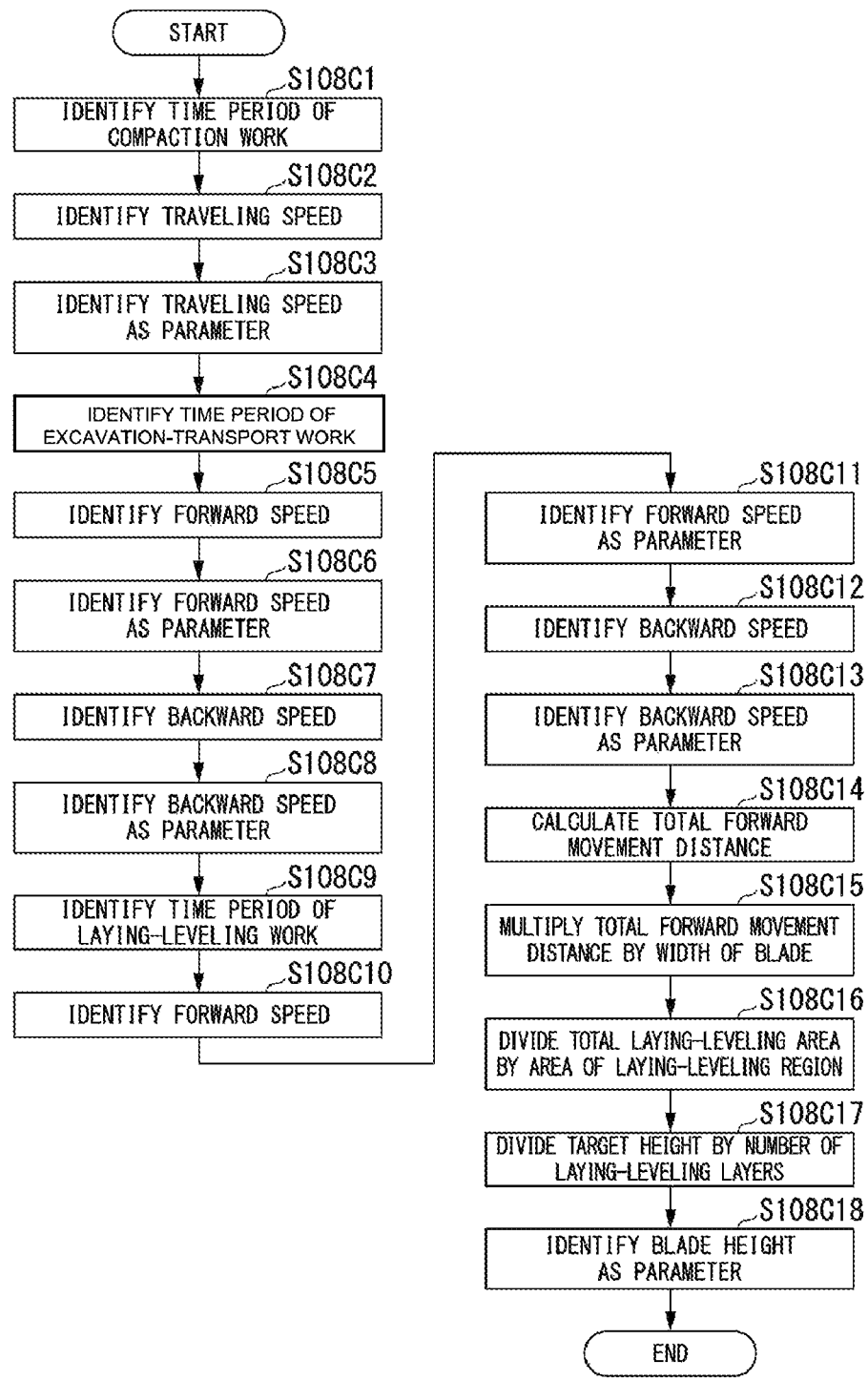
FIG. 16 is a flowchart showing a method of identifying a parameter of the bulldozer in the first embodiment.

FIG. 16 is a flowchart showing a method of identifying a parameter of the bulldozer in the first embodiment.

The parameter identifying unit 105 identifies time periods in which the work state of the bulldozer M2 is compaction work (step S108C1). The parameter identifying unit 105 identifies traveling speeds (forward speeds or backward speeds) of the bulldozer M2 in the time periods on the basis of a time series of speed data (step S108C2). The parameter identifying unit 105 identifies an average value of the traveling speeds as a parameter related to the compaction work or a parameter related to a speed (step S108C3).

Next, the parameter identifying unit 105 identifies time periods in which the work state of the bulldozer M2 is excavation-transport work (step S108C4). The parameter identifying unit 105 identifies traveling speeds (forward speeds) of when the bulldozer M2 is moved forward in the time periods on the basis of a time series of position data and a time series of speed data (step S108C5). The parameter identifying unit 105 identifies an average value of the forward speeds as a parameter related to the excavation-transport work or a parameter related to a speed (step S108C6). The parameter identifying unit 105 identifies traveling speeds (backward speeds) of when the bulldozer M2 is moved backward in the time periods identified in step S108C4 on the basis of a time series of position data and a time series of speed data (step S108C7). The parameter identifying unit 105 identifies an average value of the backward speeds as a parameter related to the excavation-transport work or a parameter related to a speed (step S108C8).

Next, the parameter identifying unit 105 identifies time periods in which the work state of the bulldozer M2 is laying-leveling work (step S108C9). The parameter identifying unit 105 identifies traveling speeds (forward speeds) of when the bulldozer M2 is moved forward in the time periods on the basis of a time series of position data and a time series of speed data (step S108C10). The parameter identifying unit 105 identifies an average value of the forward speeds as a parameter related to the laying-leveling work or a parameter related to a speed (step S108C11). The parameter identifying unit 105 identifies backward speeds of the bulldozer M2 in the time periods identified in step S108C9 on the basis of a time series of position data and a time series of speed data (step S108C12). The parameter identifying unit 105 identifies an average value of the backward speeds as a parameter related to the laying-leveling work or a parameter related to a speed (step S108C13).

With respect to the respective time periods identified in step S108C9, the parameter identifying unit 105 calculates a total forward movement distance of the bulldozer M2 in the time periods (step S108C14). The total forward movement distance of the bulldozer M2 is a distance in which the bulldozer M2 presses earth and sand so as to perform laying-leveling work. The parameter identifying unit 105 multiplies the specified total forward movement distance by a width of the blade in the respective time periods, and thus calculates a total laying-leveling area (step S108C15).

The parameter identifying unit 105 divides the specified total laying-leveling area in the respective time periods by an area of a laying-leveling region in which the bulldozer M2 is present in the time periods, and thus identifies the number of laying-leveling layers (step S108C16). The area of the laying-leveling region may be identified by using, for example, a time series of position data of the bulldozer M2 in the time periods, for example, a convex hull of position data. The parameter identifying unit 105 divides a laying-leveling target height by the number of laying-leveling layers so as to identify blade heights in the respective time periods (step S108C17). The parameter identifying unit 105 identifies an average value of the blade heights as a parameter related to the laying-leveling work or a parameter related to a work amount (step S108C18). The laying-leveling target height is a bottom-raised height required in the laying-leveling work, and, generally, the bottom cannot be raised to the height all at once in a single action of laying-leveling work. For example, in a case where the laying-leveling target height is 30 cm, the bulldozer M2 repeatedly performs work of raising the bottom by about 3 cm in a single piece of laying-leveling work ten times, and thus the bottom is finally raised to the laying-leveling target height. In other words, in this example, the operator sets a blade height of the bulldozer M2 to 3 cm. The blade height is a parameter used for both of the laying-leveling work and the excavation-transport work.

<<Parameter of dump truck M3>>

Figure 17:
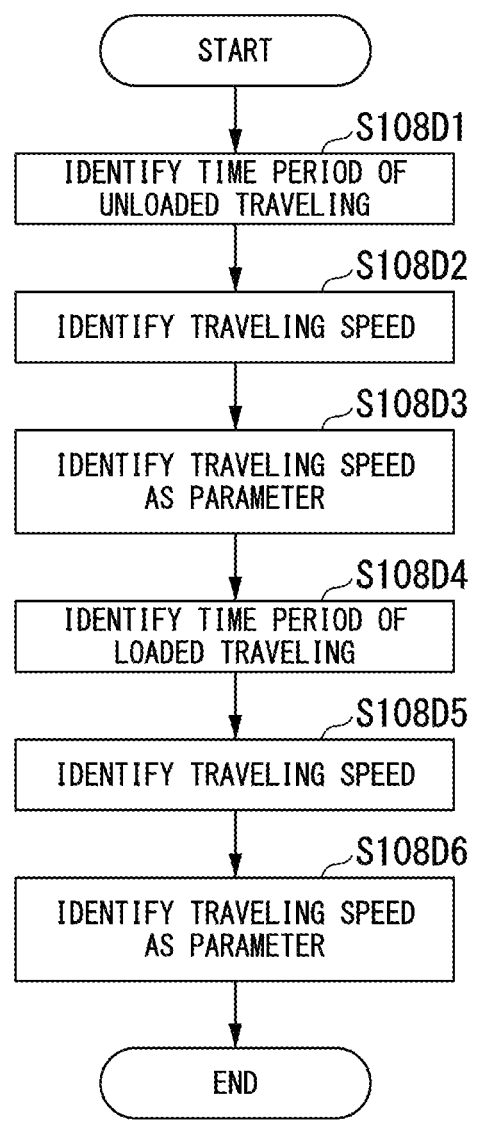
FIG. 17 is a flowchart showing a method of identifying a parameter of the dump truck in the first embodiment.

FIG. 17 is a flowchart showing a method of identifying a parameter of the dump truck in the first embodiment.

The parameter identifying unit 105 identifies time periods in which the work state of the dump truck M3 is unloaded traveling (step S108D1). The parameter identifying unit 105 identifies traveling speeds of the dump truck M3 in the time periods on the basis of a time series of traveling speeds (step S108D2). The parameter identifying unit 105 identifies an average value of the traveling speeds as a parameter related to the unloaded traveling or a parameter related to a speed (step S108D3).

The parameter identifying unit 105 identifies time periods in which the work state of the dump truck M3 is loaded traveling (step S108D4). The parameter identifying unit 105 identifies traveling speeds of the dump truck M3 in the time periods on the basis of a time series of traveling speeds (step S108D5). The parameter identifying unit 105 identifies an average value of the traveling speeds as a parameter related to the loaded traveling or a parameter related to a speed (step S108D6).

Through the process in step S107, the parameter identifying unit 105 can identify a parameter of each work machine M for each work state.

<<Simulation in Simulation System>>

Figure 18:
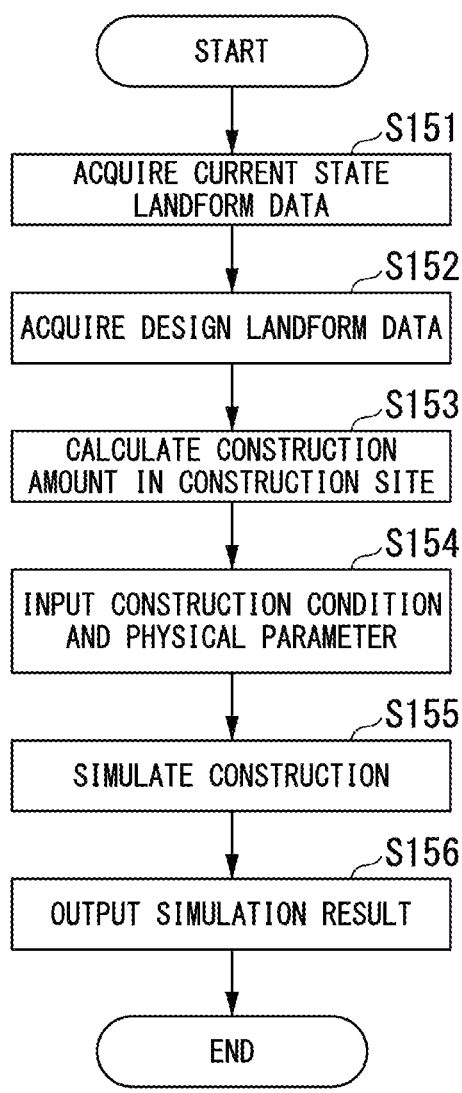
FIG. 18 is a flowchart showing a simulation method according to the first embodiment.

FIG. 18 is a flowchart showing a simulation method according to the first embodiment.

The simulation system 10 executes simulation of the construction site G by using parameters stored in the parameter storage unit 202. The simulation system 10 may execute simulation by using initial values of the parameters before the parameter identifying unit 105 identifies the parameters.

The current status landform acquisition unit 106 acquires current status landform data representing a current status landform of the construction site G (step S151). The design landform acquisition unit 107 acquires design landform data representing a design landform of the construction site G (step S152). The construction amount calculation unit 109 calculates a construction amount (an earth column amount in the earth cut location G1 and a banking amount in the banking location G2) in the construction site on the basis of a difference between the current status landform data and the design landform data (step S153). The input data acquisition unit 108 receives input of construction conditions and physical parameters of the work machines M (a bucket size of the hydraulic excavator M1, a blade size of the bulldozer M2, the maximum load capacity of the dump truck M3) disposed in the construction site G (step S154). The simulation unit 110 simulates construction in the construction site G on the basis of the parameters or the initial values of the parameters stored in the parameter storage unit 202, the data acquired by the input data acquisition unit 108, and the construction data calculated by the construction amount calculation unit 109 (step S155). The simulation unit 110 calculates, for example, a time series of progress of the construction, a construction period, or construction cost in the construction site G. The output control unit 111 outputs an output signal indicating a simulation result in the simulation unit 110 to the output device 600 (step S156).

Advantageous Effects

As mentioned above, according to the first embodiment, the simulation system 10 identifies the work state of the work machine M, and identifies a parameter (for example, a traveling speed) related to a speed of the work machine M in the identified work state. Consequently, the simulation system 10 can obtain a parameter close to the construction performance of the actual work machine M.

According to the first embodiment, the simulation system 10 identifies work of the work machine M, and identifies a parameter of the work machine M in the work on the basis of a time series of position data, a time series of azimuth data, and a time series of speed data. Consequently, the simulation system 10 can obtain a parameter close to the construction performance of the actual work machine M.

According to the first embodiment, the simulation system 10 identifies the type of work of a certain work machine M on the basis of a relationship between a position of the certain work machine M (for example, the hydraulic excavator M1) and another work machine M (for example, the dump truck M3). Consequently, the simulation system 10 can accurately identify the type of work of the work machine M.

According to the first embodiment, the simulation system 10 identifies the number of cycles on the basis of a time series of azimuth data in a case where work of the hydraulic excavator M1 is loading work. According to the first embodiment, the simulation system 10 identifies a bucket coefficient by using the number of cycles. Consequently, the simulation system 10 can identify the number of loading cycles and a bucket coefficient even though the hydraulic excavator M1 is not provided with a special sensor such as a stroke sensor or a payload meter. The bucket coefficient is an example of a parameter related to a work amount indicating an amount of earth and sand scooped up by the work machine.

According to the first embodiment, the simulation system 10 identifies a blade height of the bulldozer M2 on the basis of a time series of position data in a case where work of the bulldozer M2 is laying-leveling work. Consequently, the simulation system 10 can identify a blade height even though the bulldozer M2 is not provided with a special sensor such as a stroke sensor. The blade height is an example of the height of earth and sand in leveling using the work machine M.

According to the first embodiment, the simulation system 10 may identify a traveling speed of the work machine M in the work state on the basis of a time series of position data of the work machine M for each work state (forward movement or backward movement, that is, the type of work) of the work machine M. Consequently, the simulation system 10 can identify a traveling speed in each work state even though the work machine M does not output the work state and a traveling speed through communication.

According to the first embodiment, with respect to slope shaping work, the simulation system 10 identifies a work amount of the work machine M related to the slope shaping work on the basis of a time series of position data of the work machine M.

According to the first embodiment, in a case where there is a deviation between a simulation result based on initial values of parameters and an actual progress status, a user may cause the simulation system 10 to identify parameters, and to perform simulation again by using the identified parameters. Consequently, it is possible to propose such an operation which corrects a deviation of the progress status on the basis of practical parameters.

The simulation system 10 according to the first embodiment measures a blade height by using position data, but is not limited thereto. For example, the simulation system 10 according to other embodiments may obtain by detecting an operation lever (including PPC pressure) or may obtain a blade height by using various sensors provided in an implement or a cylinder.

The simulation system 10 according to the first embodiment measures the number of cycles by using position data or azimuth data, but is not limited thereto. For example, the simulation system 10 according to other embodiments may measure the number of cycles by counting number of times of loading earth and sand into the bucket by using a payload meter provided in the hydraulic excavator M1. The simulation system 10 according to other embodiment may measure the number of cycles through image analysis using a sensor provided in the hydraulic excavator M1 or a motion sensor or a camera provided outside the hydraulic excavator M1.

The simulation system 10 according to the first embodiment identifies the work state of the work machine M on the basis of a positional relationship between the work machine M and another work machine M by using a GNSS, but is not limited thereto. For example, the simulation system 10 according to other embodiments may identify the work state of the work machine M by using a positional relationship between the work machines M through inter-vehicle communication.

The simulation system 10 according to the first embodiment identifies a bucket coefficient on the basis of the maximum loadable amount of the dump truck M3 and the number of cycles, but is not limited thereto. For example, the simulation system 10 according to other embodiments may detect earth and sand scooped up by the bucket by using a sensor, and may thus identify a bucket coefficient. Examples of the sensor may include a payload meter, a camera, a stereo camera, and a laser scanner.

The simulation system 10 according to the first embodiment identifies and stores an averaged value as a parameter in the work state of the work machine M, but is not limited thereto. For example, the simulation system 10 according to other embodiments may store a value calculated in each time as a parameter.

Second Embodiment

Next, a second embodiment will be described. The simulation system according to the first embodiment determines that the work state of the dump truck M3 is loaded traveling in a case of traveling after loading work and before discharge work, and that the work state thereof is unloaded traveling in a case of traveling after discharge work and before loading work. In contrast, in the second embodiment, the work state of the dump truck M3 is identified on the basis of position information of the dump truck M3.

The work state of the dump truck M3 identified by the simulation system 10 according to the second embodiment includes outside-location loaded traveling in which the dump truck is traveling on the traveling path G3 in a loaded state, outside-location unloaded traveling in which the dump truck is traveling on the traveling path G3 in an unloaded state, turning traveling in which the dump truck is traveling in a turning region provided in the earth cut location G1 or the banking location G2, backward traveling in which the dump truck is traveling in a backward region provided in the earth cut location G1 or the banking location G2, inside-location loaded traveling in which the dump truck is normally traveling in a loaded state in the earth cut location G1 or the banking location G2, and inside-location unloaded traveling in which the dump truck is traveling in an unloaded state in the earth cut location G1 or the banking location G2. The earth cut location G1, the banking location G2, the turning region, and the backward region are designated as, for example, geofences in advance. In this case, the work state identifying unit 104 identifies the work state of the dump truck M3 on the basis of whether or not a position indicated by position data of the dump truck M3 is inside a geofence.

Figure 19:
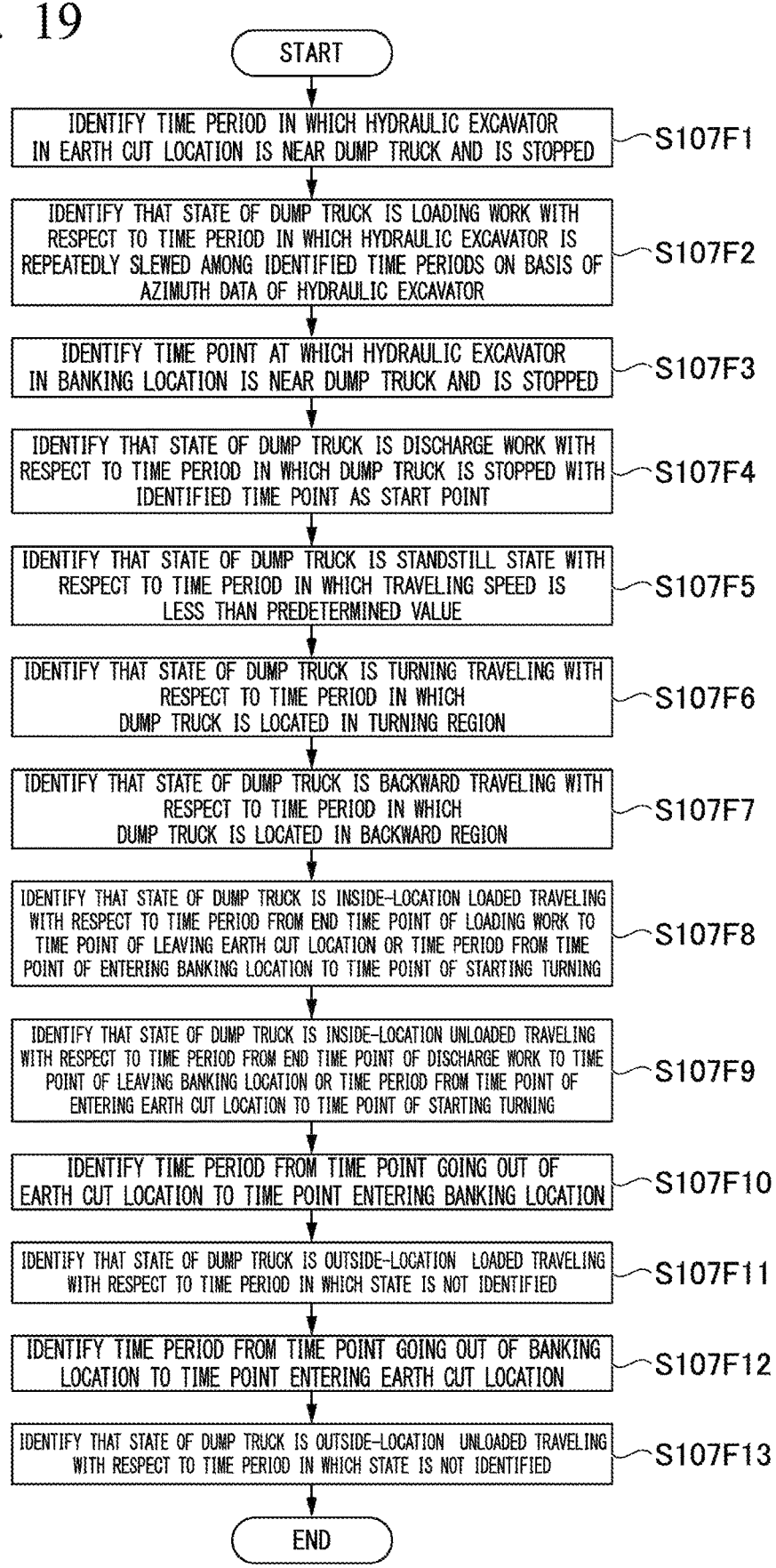
FIG. 19 is a flowchart showing a method of identifying the work state of a dump truck in a second embodiment.

FIG. 19 is a flowchart showing a method of identifying the work state of the dump truck in the second embodiment.

The work state identifying unit 104 identifies time periods in which the dump truck M3 is located within a predetermined distance from the hydraulic excavator M1 disposed in the earth cut location G1, and the hydraulic excavator M1 and the dump truck M3 are stopped, on the basis of a time series of position data and a time series of traveling speeds (step S107F1). Next, the work state identifying unit 104 identifies that the work state (the type of work) of the dump truck M3 located within a predetermined distance from the hydraulic excavator M1 is a loading work state with respect to a time period in which the hydraulic excavator M1 is repeatedly slewed among the identified time periods on the basis of a time series of azimuth data (step S107F2).

The work state identifying unit 104 identifies a time point at which the dump truck M3 is located within a predetermined distance from the hydraulic excavator M1 disposed in the banking location G2, and the hydraulic excavator M1 and the dump truck M3 are stopped, on the basis of a time series of position data and a time series of traveling speeds (step S107F3). Next, the work state identifying unit 104 identifies that the work state (the type of work) of the dump truck M3 is a discharge work state with respect to a time period in which at least the dump truck M3 is stopped with the identified time point as a start point (step S107F4).

The work state identifying unit 104 identifies that the work state of the dump truck M3 is a standstill state with respect to a time period in which a traveling speed of the dump truck M3 is less than a predetermined value among time periods in which the work state of the dump truck M3 is not identified (step S107F5).

The work state identifying unit 104 identifies that the work state of the dump truck M3 is turning traveling with respect to a time period in which the dump truck M3 is located in the turning region among the time periods in which the work state of the dump truck M3 is not identified (step S107F6). The work state identifying unit 104 identifies that the work state of the dump truck M3 is backward traveling with respect to a time period in which the dump truck M3 is located in the backward region among the time periods in which the work state of the dump truck M3 is not identified (step S107F7).

The work state identifying unit 104 identifies that the work state of the dump truck M3 is inside-location loaded traveling with respect to a time period from an end time point of loading work in the earth cut location G1 to a time point at which the dump truck M3 leaves the earth cut location G1 or a time period from a time point at which the dump truck M3 enters the banking location G2 to a time point at which the dump truck enters the turning region of the banking location G2 among the time periods in which the work state of the dump truck M3 is not identified (step S107F8). The work state identifying unit 104 identifies that the work state of the dump truck M3 is inside-location unloaded traveling with respect to a time period from an end time point of discharge work in the banking location G2 to a time point at which the dump truck leaves the banking location G2 or a time period from a time point at which the dump truck enters the earth cut location G1 to a time point at which the dump truck enters the turning region of the earth cut location G1 among the time periods in which the work state of the dump truck M3 is not identified (step S107F9). In other words, even though the dump truck M3 is located in the earth cut location G1 or the banking location G2, in a case where the dump truck M3 is located in the turning region or the backward region of the earth cut location G1 or the banking location G2, the work state of the dump truck M3 is not inside-location loaded traveling or inside-location unloaded traveling.

The work state identifying unit 104 identifies time periods from a time point at which the dump truck goes out of the earth cut location G1 to a time point at which the dump truck enters the banking location G2 (step S107F10). The work state identifying unit 104 identifies that the work state of the dump truck M3 is outside-location loaded traveling with respect to a time period in which the work state of the dump truck M3 is not identified among the time periods identified in step S107F10 (step S107F11).

The work state identifying unit 104 identifies time periods from a time point at which the dump truck goes out of the banking location G2 to a time point at which the dump truck enters the earth cut location G1 (step S107F12). The work state identifying unit 104 identifies that the work state of the dump truck M3 is outside-location unloaded traveling with respect to a time period in which the work state of the dump truck M3 is not identified among the time periods identified in step S107F12 (step S107F13).

In the same manner as in the first embodiment, the parameter identifying unit 105 calculates an average value of traveling speeds in time periods related to each work state, and thus identifies a traveling speed related to each work state as a parameter related to a speed.

In other words, the simulation system 10 according to the second embodiment identifies the work state of the work machine M on the basis of a position of the work machine M, that is, whether or not the work machine M is present in a predetermined region, whether or not the work machine M enters a region, or whether or not the work machine M goes out of a region.

Other Embodiments

As mentioned above, embodiments has been described with reference to the drawings, but a specific configuration is not limited to the above-described configurations, and various design changes may occur.

For example, in the embodiments, the simulation system 10 identifies parameters and performs simulation using the parameters, but is not limited thereto. For example, in other embodiments, a parameter identifying device identifying a parameter may be provided separately from the simulation system 10. For example, a computer carried by the work machine M may identify a parameter of the work machine M, and the simulation system 10 may receive the parameter of the work machine M from the computer, so as to perform simulation.

In the embodiments, the hydraulic excavator M1, the bulldozer M2, and the dump truck M3 have been described as examples of the work machine M, but are not limited thereto. For example, the simulation system 10 may identify the work state of a wheel loader or a road roller, and may calculate a parameter thereof. Work states and parameters of the wheel loader and the road roller may be obtained according to the same method as the method of obtaining the work state and a parameter of the bulldozer M2.

The hydraulic excavator M1 according to other embodiments may shape a groove. The work state and a parameter of the hydraulic excavator M1 shaping a groove may be obtained according to the same method as the method of obtaining the work state and a parameter of the slope excavator. Examples of parameters related to a wafer amount in groove excavation work may include a distance of a groove an area of the groove, or an earth amount of the groove, excavated and shaped per unit time. The groove excavation work is an example of shaping work.

The hydraulic excavator M1 according to other embodiments may perform excavation work without loading. For example, the hydraulic excavator M1 may excavate excavation target earth and sand, and may discharge the excavated earth and sand around another loading excavator such that the loading excavator easily excavates the earth and sand. In this case, excavation work is determined by identifying a time period in which the hydraulic excavator M1 is stopped and is repeatedly slewed. In determination of the excavation work, a condition in which the hydraulic excavator M1 is near the dump truck M3 may not be referred to. A parameter for the excavation work in this case may be obtained according to the same method as the method of obtaining a parameter for loading work of the hydraulic excavator M1.

In the embodiments, a calculated parameter is used for simulation, but is not limited thereto. For example, in other embodiments, a calculated parameter may be used for other applications such as management of capability of a worker. Thus, the simulation system 10 may calculate and store a parameter for each operator, and may calculate and store a parameter for each type number of the work machine M.

In the simulation system 10 according to the embodiments, a description has been made of a case where the program is stored in the storage 300, but this is only an example. For example, in other embodiments, the program may be delivered to the simulation system 10 via a communication line. In this case, the simulation system 10 develops the delivered program to the main memory 200, and executes the processes.

The program may realize some of the above-described functions. For example, the program may realize the above-described functions through a combination with another program already stored in the storage 300 or a combination with another program installed in another device.

The simulation system 10 may include a programmable logic device (PLD) in addition to the configuration or instead of the configuration. Examples of the PLD may include a programmable array logic (PAL), a generic array logic (GAL), a complex programmable logic device (CPLD), and a field programmable gate array (FPGA). In this case, some of the functions realized by the processor 100 may be realized by the PLD.

INDUSTRIAL APPLICABILITY

According to the aspects, the parameter identifying device can obtain a parameter close to the construction performance of an actual work machine.

REFERENCE SIGNS LIST

10: SIMULATION SYSTEM
100: PROCESSOR
200: MAIN MEMORY
300: STORAGE
400: INTERFACE
500: INPUT DEVICE
600: OUTPUT DEVICE
101: POSITION RECEPTION UNIT
102: AZIMUTH RECEPTION UNIT
103: TIME-SERIES RECORDING UNIT
104: WORK STATE IDENTIFYING UNIT
105: PARAMETER IDENTIFYING UNIT
106: CURRENT STATUS LANDFORM ACQUISITION UNIT
107: DESIGN LANDFORM ACQUISITION UNIT
108: INPUT DATA ACQUISITION UNIT
109: CONSTRUCTION AMOUNT CALCULATION UNIT
110: SIMULATION UNIT
111: OUTPUT CONTROL UNIT
201: TIME-SERIES STORAGE UNIT
202: PARAMETER STORAGE UNIT
G: CONSTRUCTION SITE
G1: EARTH CUT LOCATION
G2: BANKING LOCATION
G3: TRAVELING PATH
M: WORK MACHINE
M1: HYDRAULIC EXCAVATOR
M2: BULLDOZER
M3: DUMP TRUCK

The invention claimed is:

1. A simulation system comprising:
   a processor;
   a main memory;
   a storage storing a program; and
   an output device;
   wherein the processor executes the program to function as:
      a time-series recording unit that is configured to store a time series of position data of each work machine of a plurality of work machines in a construction site and a time series of azimuth data of each work machine into a main memory, the position data and the azimuth data being collected in advance from each work machine of the plurality of work machines during an operation of each work machine in the construction site,
      a work state identifying unit that is configured to generate a time series of traveling speeds of each work machine by calculating a traveling speed of each work machine at each time point on the basis of the time series of position data of each work machine stored in the main memory and is configured to identify work states of each work machine on the basis of time-series data including the time series of position data, the time series of azimuth data, and the time series of traveling speeds, and a parameter identifying unit that is configured to identify a first parameter and a second parameter, the first parameter related to a work amount per unit time of the work machine for each of the work states on the basis of the time series data, the second parameter related to a traveling speed of the work machine for each of the work states on the basis of the time series of traveling speeds of the work machine, a simulation unit that is configured to simulate construction in the construction site on the basis of the first parameter and the second parameter identified by the parameter identifying unit, and an output control unit that is configured to output an output signal indicating a simulation result in the simulation unit, to the output device.

2. The simulation system according to claim 1,
wherein the work state identifying unit identifies the work states of the work machine on the basis of a positional relationship between a position of the work machine and an earth cut location or a banking location.

3. The simulation system according to claim 1,
wherein the work machine is a dump truck, and
wherein the work state identifying unit identifies unloaded traveling and loaded traveling as the work states.

4. The simulation system according to claim 1,
wherein the work machine is a bulldozer, and
wherein the parameter identifying unit identifies a forward speed and a backward speed as the second parameter on the basis of a time series of speed data of the bulldozer.

5. The simulation system according to claim 1,
wherein the work state identifying unit identifies the work states on the basis of a relationship between a position of the work machine and a position of another work machine.

6. The simulation system according to claim 1,
wherein the work machine is a hydraulic excavator,
wherein the parameter identifying unit identifies the number of cycles or one cycle time as the first parameter on the basis of a time series of azimuth data of the work machine in a case where the work state is loading work, and
wherein the number of cycles indicates the number of times of repetition of processes of scooping up earth and sand and loading the earth and sand onto a dump truck, and the one cycle time indicates a required time to perform one cycle of a process of scooping up earth and sand and loading the earth and sand onto the dump truck.

7. The simulation system according to claim 6,
wherein the parameter identifying unit identifies a bucket coefficient of a capacity of earth and sand to a bucket capacity as the first parameter on the basis of the number of cycles.

8. The simulation system according to claim 1,
wherein the parameter identifying unit identifies a shaping area or a shaping volume per unit time as the first parameter on the basis of a time series of position data of the work machine in a case where the work state is shaping work.

9. The simulation system according to claim 1,
wherein the work machine is a bulldozer, and
wherein the parameter identifying unit identifies a blade height of the bulldozer as the first parameter on the basis of a time series of position data of the bulldozer in a case where the work state is laying-leveling work or excavation-transport work.

10. The simulation system according to claim 1,
wherein the work state identifying unit identifies the work state of each work machine in each time period and displays by arranging time charts of different work machines.

11. The simulation system according to claim 1,
wherein the simulation unit calculates at least one of a time series of progress of the construction, a construction period, and construction cost in the construction site.

12. A simulation method comprising the steps of:

collecting position data and azimuth data from each work machine of a plurality of work machines during an operation of each work machine in a construction site;

generating a time series of position data of each work machine and a time series of azimuth data of each work machine on the basis of the collected position data and the collected azimuth data;

generating a time series of traveling speeds of each work machine by calculating a traveling speed of each work machine at each time point on the basis of the time series of position data of each work machine;

identifying work states of each work machine on the basis of time-series data including the time series of position data, the time series of azimuth data, and the time series of traveling speeds;

identifying a first parameter and a second parameter, the first parameter related to a work amount per unit time of the work machine for each of the work states on the basis of the time-series data, the second parameter related to a traveling speed of the work machine for each of the work states on the basis of the time series of traveling speeds of the work machine;

simulating construction in the construction site on the basis of the first parameter and the second parameter; and outputting an output signal indicating a simulation result in the step of simulating, to an output device.

* * * * *